United States Patent [19]
Baur et al.

[11] Patent Number: 5,115,305
[45] Date of Patent: May 19, 1992

[54] ELECTRICALLY ADDRESSABLE LIQUID CRYSTAL PROJECTION SYSTEM WITH HIGH EFFICIENCY AND LIGHT OUTPUT

[76] Inventors: Thomas G. Baur, 7460 Weld County Rd. 1, Longmont, Colo. 80504; Roger H. Badertscher, 27284 Byrne Park La., Los Altos, Calif. 94022

[21] Appl. No.: 549,594

[22] Filed: Jul. 5, 1990

[51] Int. Cl.$^5$ .............................................. H04N 9/31
[52] U.S. Cl. ........................................ 358/60; 358/61; 359/40
[58] Field of Search ................... 358/60, 61; 350/376, 350/379, 337, 338, 331 R; 353/31, 34; 359/73, 40, 41

[56] References Cited

U.S. PATENT DOCUMENTS

| | | |
|---|---|---|
| 4,127,322 | 11/1978 | Jacobson et al. |
| 4,191,456 | 3/1980 | Hong et al. |
| 4,582,396 | 4/1986 | Bos et al. |
| 4,827,334 | 5/1989 | Johnson et al. ............... 358/60 |
| 4,864,390 | 9/1989 | McKechnie et al. |
| 5,028,121 | 7/1991 | Baur et al. ...................... 359/41 |
| 5,042,921 | 8/1991 | Sato et al. ...................... 359/73 |
| 5,066,108 | 11/1991 | McDonald ...................... 359/73 |

FOREIGN PATENT DOCUMENTS 00640 1/1987 World Int. Prop. O.

OTHER PUBLICATIONS

Sharp LCD Projector XV-100F.
Epson Crystal Image Video Projector.
CRT and LCD Projection TV: A Comparison-Martin V. C. Stroomer.
Current Trends in Optics for Projection TV.
Full Color Projector with Poly-Si Thin Film Transistor Light Valves.

Primary Examiner—James J. Groody
Assistant Examiner—Kim Yen Vu
Attorney, Agent, or Firm—James R. Young

[57] ABSTRACT

An improved polarized color video projector incorporates a light source to provide three collimated beams of linearly polarized light of blue, green, and red colors. A light modulator capable of imparting a video image in a light beam is positioned in each of the three colored beams to modulate the individual colored image components in each of the beams. A dischroic beam recombiner receives the modulated blue and green beams, and recombines them into a combined blue and green color image carrying beam. A polarization-selective/beam analyzer/recombiner receives the recombined blue and green beam and recombines it with the red beam. A retarder placed between the light modulator for the red beam and the polarization-selective/beam analyzer/recombiner, in the path of the modulated red beam, rotates the plane of polarization of the red beam to allow it to be recombined with the recombined blue and green beam in the polarization-selective/beam analyzer/recombiner. Projection apparatus receives the recombined blue, green, and red beams and projects them onto a display screen.

76 Claims, 9 Drawing Sheets

ELECTRICALLY ADDRESSABLE LIQUID CRYSTAL PROJECTION SYSTEM WITH HIGH EFFICIENCY AND LIGHT OUTPUT

BACKGROUND OF THE INVENTION

1. Field of the Invention

This invention relates to optical projection systems in general and in particular to color video projector system using transmissive light valves and, non-absorptive polarization control technology. The new video projector system provides improved overall efficiency and higher light output in a compact, easily manufacturable configuration.

2. Brief Description of the Prior Art

Video projection systems have been utilized for some time in a broad range of applications. For example, such systems can be found in the home for consumer use, in command/control centers for military use, as part of CAD/CAM systems, in conference rooms for general business use, in restaurants/bars for group viewing of sporting events, and in commercial aircraft. These applications are reflected already in a number of products in the marketplace at a broad range of price performance points, and the range of different applications will continue to expand. However, light efficiency, light output, size, and cost of such video projector apparatus continue to be problematic factors that are limiting more wide-spread use and customer acceptance.

Several different technologies have been used in the development and manufacture of video projection systems. Principle among them are cathode ray tube (CRT) based systems and the light valve based systems. The CRT based systems generate their light outputs by the excitation of phosphors via electron beams. Light valve based systems, on the other hand, modulate beams of light, both spatially and temporally, via light valves. Designers of systems employing both technologies are continually attempting to improve their products. Performance issues of particular importance include light output or intensity (brightness) capability, resolution, overall light efficiency, and size. Ease of manufacture and cost are also important considerations.

CRT based video projection systems project images produced by electron beam excitation of a phosphor, similar to a conventional television picture tube. High video image resolution is easily obtained with such CRT based systems, but achieving high light output, or high brightness in large images is difficult and expensive. Although improvements are being made in excitation efficiencies of phosphor materials for this purpose, there are still practical limits on the amount of light that can be generated by electron excitation of phosphors. As a result, efforts to achieve more light output in CRT based systems have generally resorted to the use of larger CRT's. Consequently, CRT based systems have generally been large and difficult to align and maintain, in addition to being increasingly expensive when high light output is required.

Light valve based systems fall into multiple categories and have utilized oil films, magneto-optical materials, and liquid crystals, as light valves for modulating light beams to write video images into the beams. Commercial color projection systems that use electrically alterable liquid crystals (LC's) as light valves have been a relatively recent occurrence and are of principle interest here. They offer the promise of small size, low cost, ease of alignment, and low maintenance. However, current commercial liquid crystal (LC) systems, particularly those in which light is transmitted through the light valve, are very limited in resolution, light output capability, and overall efficiency, as will be discussed in more detail below.

Current LC light valve based commercial color video projection systems operate on the principle of separating a beam of white light into three polarized red, green, and blue components. Three separate LC light valves positioned respectively in the separate red, green, and blue color light beams are then driven to modulate the color light beam components in such a manner as to impart the desired video images to the color beam components by altering polarizations of pixel portions of the light beams. Separate polarizers are then used in each light path to "analyze" the beam, i.e., to transmit light from pixels of the light valve having the desired polarization characteristics and to block light from those pixels of the light valve that do not have the desired polarization characteristics. The separate beam components are then recombined to form the color video image for projection onto a viewing screen.

Several current commercial LC systems, such as those made by Epson, Sharp, and Toshiba, use light valves that use electrically addressable pixel arrays to modulate the three colored beam components. The image resolution of such LC based systems is limited by the number or density of individually electrically addressable pixels that can be built into an LC light valve. Today, this number is in the 100,000 to 200,000 pixel range, but advances in manufacturing technology can be expected to lead to rapid improvements. These systems have other significant limitations in that they are very inefficient and greatly limited in available light output. These systems typically use about a 200 watt light source and yet only have light output in the range of 100 lumens and an overall efficiency of about 2%. The major advantage of electrically addressable LC systems are their small size and low cost.

There are also LC based systems that use the light output of CRTs to activate the liquid crystal devices. These LCs in turn modulate beams of light in a reflective mode. These systems have been used in high end applications by manufacturers such as the Hughes Aircraft Company. Such systems are capable of very high resolution. However, they are also very complex systems that are further characterized by very high cost, large size, high power dissipation, and other characteristics that make them unsuitable for high volume commercial applications.

In general, the light output and efficiency of LC systems are in a large measure attributed to how the polarized light is created, analyzed, and recombined. Improvements in any of these methods can lead to reduced power and cooling requirements, improved lifetime, smaller size, and lower cost as well as higher light output and efficiency. In short, the competitiveness of these LC based systems is greatly influenced by the design of the polarization control system.

In the Epson, Sharp, and Toshiba systems mentioned above, which are electrically driven LC systems, major light losses are attributable to the methods used to create, analyze, and recombine the polarized light. For example, these systems all employ absorptive sheet polarizer technology for polarizing the light before it enters the LC arrays for modulation and for "analyzing" it after modulation by the LC arrays. Such absorptive polarizing sheets are stained, oriented polymers that pass only light polarized in one plane and absorb the rest. This limits light output and causes a loss in efficiency, since they can only absorb a limited amount of energy before they heat to the point of damage or destruction.

A fairly recent color projection system developed by NEC, as described in a paper entitled, "High Brightness Crystal Light Valve Projector Using a New Polarization Converter," presented at the 1990 SPIE/SPSE Symposium on Imaging and Science Technology, Feb. 11-16, 1990, in Santa Clara, Calif., addresses the efficiency problem by retaining both the "S" and "P" polarizations, converting the P polarization to S, and combining them into one S beam. However, this NEC system still uses sheet polarizers for analyzers and color recombination by wavelength selective thin film coatings to obtain a composite, full color beam. Therefore, it still has the inefficiencies associated with both of these techniques as well as an upper light output limit imposed by the sheet polarizers. Of course, the light output of systems such as this one can be increased by using larger sheet polarizers that can absorb more energy. However, such larger components would increase the overall size and cost of the projector, and would prohibit miniaturization, which is an important developmental goal.

The Hong et al. patent, U.S. Pat. No. 4,191,456, which is an example of one of the more "high-end" video projection systems in terms of cost and complexity, is assigned to Hughes Aircraft Co. and discloses an LC light valve system that uses cathode ray tubes (CRT's) to light-actuate pixels of reflective LC arrays to write video images into blue, green, and red beams. Hong, et al., attempt to solve the sheet polarizer absorption problem by replacing the sheet polarizers with polarizing beamsplitting cubes, which transmit, instead of absorb, the unwanted polarization components. The system also uses color recombination to combine the separate blue, green, and red light beams into a single beam that is passed through the one projection lens, thereby doing away with the need for three individual sets of projection lenses. Hong, et al., uses four (4) polarizing beamsplitters in combination with a number of dichroic mirrors, color trimming filters, and CRT driven reflecting light valves to accomplish the polarization modulation and recombination of the three individual colored light beams. A major deficiency of the Hong, et al., system is that it only makes use of one polarization state of the source light. The other polarization component is unused. The system, therefore, immediately loses 50% of the available light. Coupling and transmission inefficiencies associated with the relatively large number of optical components further reduce the efficiency of the system. The Hong, et al., system also requires the use of three individual CRTs to drive the light valves, thus further increasing the complexity, cost, size, and energy inefficiency of the system.

Jacobson et al., U.S. Pat. No. 4,127,322, represents an improvement over Hong, et al., in that they disclose a polarized video projection system that is able to use both polarization components generated by the light source. Jacobson, et al., also does away with several of the polarizing beamsplitter cubes required in the Hong, et al., system. Disadvantageously, this system, however, still requires at least three individual CRT's, to drive the respective reflective LC light valves, thus, still retaining the size, cost, energy inefficiencies, heat generation, and other problems associated with the use of CRT's.

Finally, one last factor leading to the overall inefficiency of LC type projector systems mentioned above is the inability to perfectly collimate the source beam before passing it through the individual LC arrays. Imperfect collimation is a direct result of the non-point nature of the light source. Such imperfect collimation causes the spot size of the source beam to rapidly diverge, or spread, as the distance from the source increases. Since the energy density of the spot is directly proportional to the square of the spot diameter, the flux through the LC array drops rapidly as the distance from the source increases. Thus, shortening the light path distance from the light source to the LC arrays is critical in achieving maximum efficiency. Similarly, shortening the light path between the LC arrays and the output lens is critical to achieving maximum light coupling to the output lens and thus efficiency for a given lens size.

Therefore, there remains a need for a relatively low cost color video projection system that has high light output and brightness, good contrast, and good resolution, but which is also small, efficient, low power consuming, and relatively easy and inexpensive to manufacture. In fact, it is desirable that products could be derived from such a system design concept that could span the range of applications from small image devices suitable for desk top computer applications to very large light output devices suitable for large screen conference or theater applications. To do so, such systems must be capable of creating and recombining the individual color beam components to produce a composite video image as efficiently and effectively as possible before passing them through a single projection lens. Prior to this invention, there have not been any color video projection systems in a commercially viable configuration suitable for use in cost sensitive markets that combine transmissive or electrically addressable LC based light valves with non-absorptive polarization selective beamsplitter/recombination cubes and other non-absorptive components for the creation, analyzation, and recombination of the light beams. There have also not been any such projection systems that are efficient enough to produce in the range of 1000 lumens or more video light output from a conventional 200 or 300 Watt or similar light source, as opposed to the approximately 100 lumens output available in other transmissive LC-based projection systems.

SUMMARY OF THE INVENTION

Accordingly, it is a general object of the present invention to provide a video projection system with improved optical efficiency, preferably approaching 100% theoretical efficiency, exclusive of coupling inefficiencies.

It is another general object of this invention to provide an electrically addressable LC modulated video projection system with improved light output, intensity, and brightness, yet with less power consumption and heat generation.

It is yet another general object of this invention to provide a LC modulated projection system with improved performance, but yet being capable of high volume, low cost manufacturing.

It is a further object of this invention to provide a video projection system that is configurable or scalable for use in miniature and small screen displays as well as large screen displays.

It is another object of this invention to provide a polarized video projection system having increased light output and brightness.

It is a further object of this invention to provide a polarization control system for LC video projectors that does not require the use of brightness and efficiency limiting sheet-type polarizers and analyzers.

It is yet another object of this invention to provide an efficient, high quality, color video projection system that does not require cathode ray tubes (CRT's).

It is yet a further object of this invention to provide a color video projection system that minimizes the distance from the light source to the LC arrays for improving the lamp-to-modulator coupling efficiency.

It is still yet a further object of this invention to provide a color video projection system that minimizes the distance from the LC arrays to the output lens for improving the modulator-to-lens coupling efficiency.

A more specific object of this invention is to provide a simple, effective, and efficient color projection system that utilizes both transmissive LC arrays for modulating images into colored light beams and at least one polarization selective beamsplitter/recombiner component for analyzing and recombining the colored light beams into a composite color video image-carrying beam that can be projected onto a display screen.

To achieve the foregoing and other objects and in accordance with the purpose of the present invention, as embodied and broadly described herein, the polarized color video projector apparatus of this invention may comprise a light source or sources for providing three approximately collimated beams of linearly polarized light, each beam being a selected primary color that, when combined with the others, can comprise a full color image. The primary colors used most commonly in color video projections are red, green, and blue. A light modulator capable of imparting a video image in a light beam is positioned in each of the three colored beams to "write" the individual colored image components in each of the beams. It is preferred, although not necessary, that each of these light modulators is an electrically addressable liquid crystal (LC) array that is capable of modulating the polarization states of pixel portions of each of the three primary color beams as such color beams are transmitted through these light modulators. Each of the three modulated color beams is then polarization analyzed to pass only the light from the pixels that form the illuminated portions of the image (the image carrying portions of the beams), and they are recombined into one component image carrying beam that can be projected on a screen or otherwise utilized. The analyzing and recombining apparatus of one embodiment can be accomplished with one dichroic mirror and one polarization-selective recombining cube. In a second embodiment, it is accomplished with two polarization-selective recombiner cubes and one dichroic mirror. A third embodiment utilizes a first polarization-selective recombiner cube, a multiwave retarder, and a second polarization selective recombiner cube.

The input light source and light manipulation components preferably include an elongated source and an elongated parallelepiped-shaped polarization beamsplitter to split the beam into two rectangular components. Those rectangular components are conditioned to match polarizations and propagated together in a beam having a substantially rectangular cross-section that is sized to match the LC light valve components.

Other alternative components for the apparatus of this invention can include, for example, modulators in the form of arrays of microscopic, electrically actuated, mechanical shutters to modulate the three components of the light beams, various appropriate light sources, polarizers, dichroic and spectral mirrors, retarders, and the like that are described in the detailed description of the preferred embodiments that follow.

The method of projecting a color video image according to this invention includes the steps of modulating three primary color light beams to impart a video image in each beam such that when they are combined together they form a composite video image carrying beam that can be projected onto a display screen or other display device, linearly polarizing the first and second color image carrying light in first planes of polarization, combining the modulated first and second color light into a combined first and second colors image carrying beam, linearly polarizing the third color image carrying light in a plane of polarization that is different from the plane of polarization of the combined first and second colors image carrying beam, and combining the third color image carrying beam with the first and second colors image carrying beam into the composite video image carrying beam.

The step of combining the first and second image carrying light beams includes directing the first and second image carrying light beams onto a color-selective surface that transmits light of the first color and reflects light of the second color or vice versa in such a manner that both the first and second colors are propagated along a common path. The step of combining the combined first and second colors image carrying beam with the third color image carrying beam includes directing the combined first and second colors image carrying beam of first polarization orientation and the third color image carrying beam of second polarization orientation onto a polarization-selective surface that reflects light in the first plane of polarization and reflects light in the second plane of polarization, or vice versa, in such a manner that both the combined first and second colors imaging carrying beam and the third color image carrying beam are propagated along a common path.

Additional objects, advantages and novel features of the invention are set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

BRIEF DESCRIPTION OF THE DRAWINGS

The accompanying drawings, which are incorporated herein and form a part of the specification illustrate the preferred embodiments of the present invention, and together with the description, serve to explain the principles of the invention. In the drawings.

DETAILED DESCRIPTION OF THE PREFERRED EMBODIMENT

Figure 1:
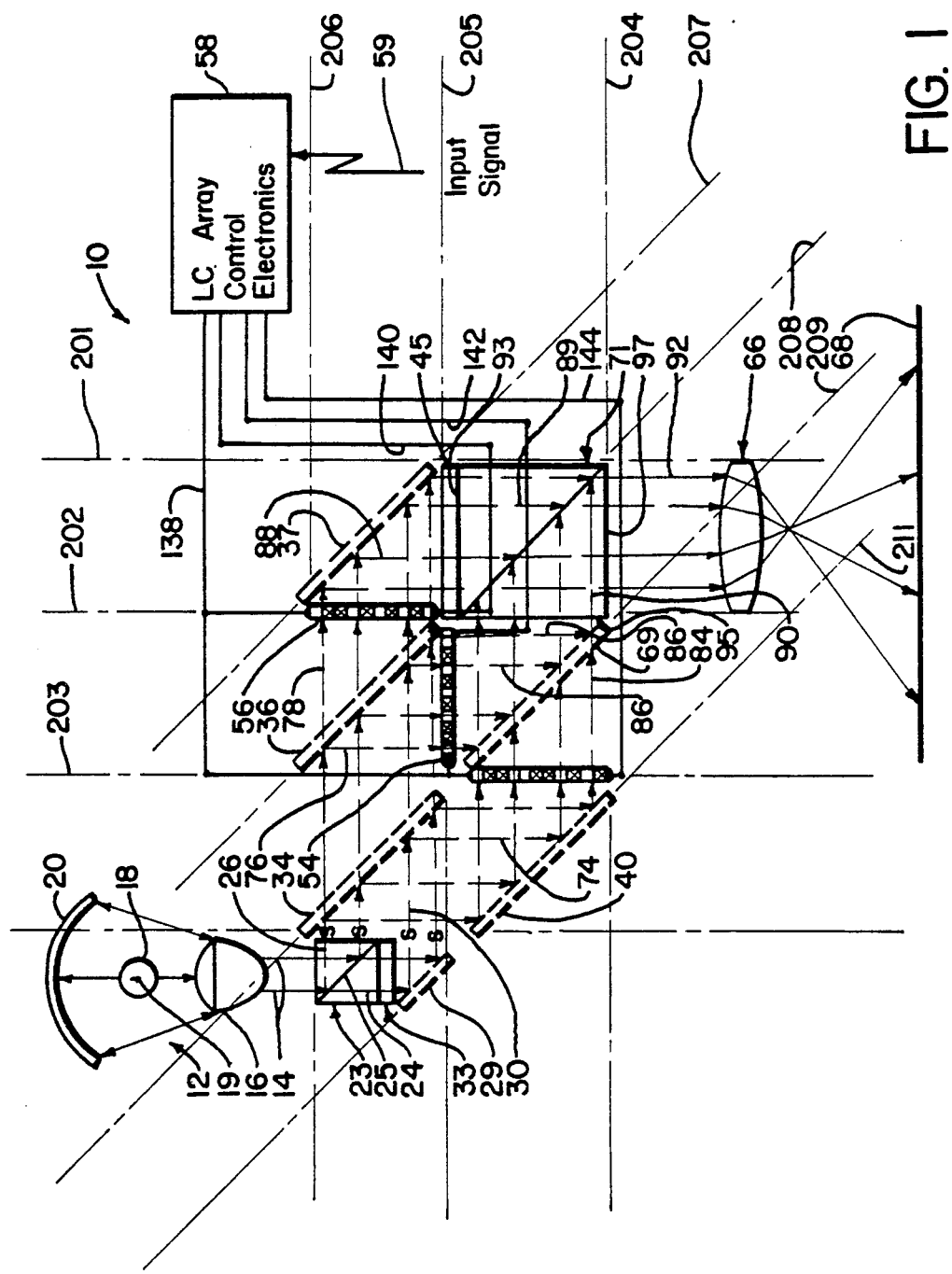
FIG. 1 is a schematic diagram showing the positionally related component planes, relevant optical paths, and polarization orientations of a first preferred embodiment of the polarized color video projector of the present invention.
Figure 2:
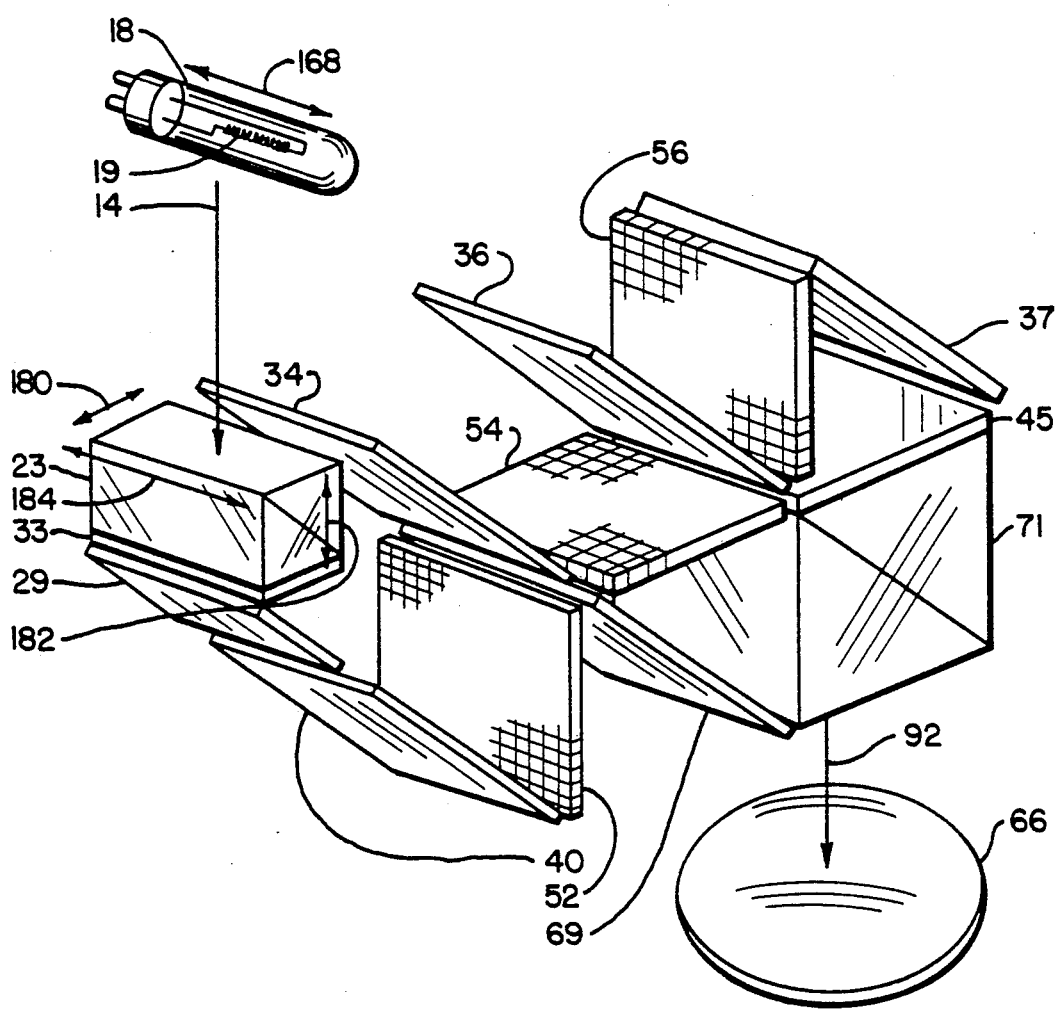
FIG. 2 is a perspective view of the principal optical components of the first preferred embodiment of the polarized color video projector of the present invention.

The polarized color projector 10 of the present invention is shown in FIGS. 1 and 2. Three color light sources, preferably blue, green, and red, provide selectively polarized blue, green, and red light beams, respectively, for modulation and combination into color video images. A first color light source, preferably glue, a second color light source, preferably green, and a third color light source, preferably red, can be separate sources, such as three individual lasers or other monochromatic sources, or, the three color light sources can comprise a single light source 12 that produces white, unpolarized light that is then collimated and selectively polarized and directed to two dichroic mirrors 34, 36 to produce blue, green, and red light beams, respectively. These beams are then passed through respective electrically addressable light valves, such as liquid crystal (LC) arrays 52, 54, and 56, which selectively change the polarization state of portions of the colored light beams. These LC arrays are controlled by appropriate control circuitry 58, which turns on selected pixels in the respective blue, green, and red LC arrays 52, 54, and 56 to obtain the required colored light components in the appropriate positions in the arrays to produce a composite visual image of the television or video scene present in the input signal 59. The image carrying blue and green beams 84, 86 are first recombined by dichroic color recombiner 69. This recombined beam 90 having blue and green components passes into a polarizing beam recombiner cube 71 where it is recombined with the polarization rotated image carrying red beam 89. A ½-wave retarder 45 rotates the plane of polarization of the image carrying red beam 88, to form rotated beam 89, allowing it to be recombined with the recombined blue and green beam 90 in polarization beam recombiner cube 71 to form the total composite color video image beam 92. Finally, the recombined blue, green, and red image carrying beam 92 is projected by lens system 66 onto a viewing screen 68.

Before proceeding with a detailed description of the various optical components of the invention, it is useful to note that nearly all of the optical components of this invention are arranged in a manner that describe eleven positionally related component planes. To assist in understanding the structure and operation of this invention, the position of the various optical components will be described in relation to these eleven planes 201–211, shown as phantom lines in FIG. 1. Specifically, vertical planes 201–203, and 210 are orthogonal to horizontal planes 204, 205, and 206, with planes 207, 208, 209, and 211 intersecting planes 201, 202, and 203 where planes 201, 202, and 203 intersect planes 204, 205, and 206. Therefore, planes 207, 208, 209, and 211 are oriented at substantially forty-five (45) degree angles to planes 201, 202, 203, and 210, as well as planes 204, 205, and 206.

Referring now to FIG. 1, a detailed description is provided by following the light paths from the source to the final image projection screen. A tungsten filament lamp or arc lamp or similar lamp 18 equipped with a spherical, elliptical, or parabolic reflector 20, and a light condenser and collimator 16 can be used to produce a nearly collimated white light beam 14. In reality, white light beam 14 is never perfectly collimated, that is, beam 14 will always diverge somewhat. This divergence of beam 14 is due to the fact that the filament 19 (or arc, if an arc lamp is used) of lamp 18 is not a point source. That is, the condenser lens 16 can only collimate the bundle of light rays from those points on the source that lie on the focal plane of the lens. However, while the light rays from each point on the focal plane ca be collimated by lens 16, the rays collimated from a first point on the focal plane will not be parallel to the rays collimated from a different point on the focal plane. Since the filament (or arc) 19 is elongated in two dimensions (see FIG. 2), which preferably lies on the focal plane of lens 16, light rays collimated from a given point on the filament (or arc) 19 along this elongated dimension will necessarily diverge from light rays collimated from other points along the filament (or arc) 19. As mentioned above, this divergence requires that the distance that beam 14 travels to each LC array be minimized for maximum efficiency. Additionally, in the preferred embodiment, the reflector 20 comprises a so-called cold mirror coating on a concave glass surface. This coating reflects only visible light and transmits infrared light out of the system to minimize heat build-up in the system.

The nearly collimated light beam 14 is directed to a polarizing beamsplitter 23, located substantially between component planes 205 and 206. The beamsplitter 23 is in the shape of a rectangular parallelepiped, and has one beam output 24 linearly polarized in the "P" orientation i.e., parallel to the plane of the paper, and a second beam output portion 26 linearly polarized in the "S" orientation, the "S" orientation being orthogonal to the plane of polarization of the first beam output portion 24, i.e., in a plane perpendicular to the plane of the paper. Essentially, polarized beamsplitter parallelepiped 23 has a polarizationsensitive surface 25 that transmits light that is linearly polarized in one direction or plane (the "P" polarized orientation) and reflects light that is linearly polarized in an orthogonal direction or plane (the "S" orientation). Thus, it functions to convert an unpolarized beam 14 into two linearly polarized beams, such as the P-polarized and S-polarized orientations described above. Such polarized beamsplitting parallelepipeds are available commercially, for example, from Meadowlark Optics in Longmont, Colo. In this example embodiment, the "P"-polarized beam portion 24 is transmitted axially through polarizing beamsplitter parallelepiped 23, and the "S" polarized beam portion 26 is reflected to emerge from the polarizing beamsplitter parallelepiped 23 orthogonal to the axis of the input beam 14.

To keep from losing one-half the energy of the light beam 14 at this stage, both output beam portions 24, 26 are utilized by rotating the plane of polarization of one of them to match the other and putting them together in parallel relation to each other. In the preferred embodiment, the output beam portion 24 is rotated 90 degrees by an achromatic ½-wave retarder plate 33 positioned adjacent the polarizing beamsplitter parallelepiped 23 in the path of the emerging beam portion 24 so that its plane of polarization is rotated to the "S" orientation, i.e., perpendicular to the plane of the paper, to match the "S" polarization orientation of beam 26.

Achromatic ½-wave retarders, such as retarder plate 33, are well known in the art and will not be described in great detail. However, for ease of understanding the preferred embodiment of the present invention, retarder plate 33 preferably retards all wavelengths by about the same ratio. In other words, it retards all wavelengths (colors) in the beam by about one-half of their respective wavelengths. Because of this nearly constant retardation ratio, retarder 33 is capable of modifying the polarization of white light beam 24 in a uniform manner regardless of wavelength. Achromatic retarders of this type may be obtained from Meadowlark Optics of 7460 Weld County Road 1, Longmont, Colo. 80504-9470.

Referring back to FIG. 1, the S-polarized output beam portion 24 is reflected by a specular mirror 29 located on component plane 211 between planes 205 and 206, as shown in FIG. 1, in a direction parallel to beam portion 26 to form, along with the rotated beam portion 24, a full beam 30 having its entire linear polarization oriented in the "S" direction, as indicated in a conventional manner by the small s's on the beam arrows shown in FIG. 1. Alternatively, the "P" polarization orientation could also be used for the full beam 30 without departing from the spirit and scope of the present invention. However, the dichroic mirrors 34, 36, and 69 function somewhat more efficiently with beams of "S" polarization orientation, rather than with beams of "P" polarization orientation. Also, the spectral reflections, such as those at mirrors 29, 34, 36, 37, and 40 do not modify the "S" or "P" polarization state of the light beams striking them because the plane of linear polarization is, in all cases, either perpendicular or parallel to the plane of incidence on these mirrors. However, all other linear polarization directions and all elliptically or circularly polarized beams would have their polarization modified. Consequently, while not necessary, there is a preference for using the "S" polarization component.

Several alternative configurations are possible regarding the relative positioning of the light source 12 and polarizing beamsplitting rectangular parallelepiped 23. For example, as will be discussed for the second embodiment shown in FIG. 3, light source 12 can be positioned such that beam 14 is parallel to the output beam 30, rather than orthogonal to output beam 30, as for the embodiment shown in FIG. 1. Other configurations to produce a linearly polarized output beam 30 are possible, as will be apparent to persons having ordinary skill in this art, once being familiar with this invention.

The linearly polarized white light beam 30 is sorted or separated into blue, green, and red component beams 74, 76, and 78, respectively, by respective blue and green dichroic mirrors 34 and 36 located on those portions of component planes 209 and 208 which are between planes 205, 206, and positioned sequentially in the path of beam 30. Functionally, dichroic mirror 34 reflects only blue light and transmits all other longer wavelengths, while dichroic mirror 36 reflects only blue and green light and transmits all other longer wavelengths, i.e., red. The result is three separate beams, i.e., blue beam 74, which is reflected orthogonal to the path of beam 30 due to the forty-five (45) degree angle of dichroic mirror 34, green beam 76, which is also reflected orthogonal to the path of beam 30, and red beam 78, which is transmitted through green dichroic mirror 36 and is therefore still on the path defined by full beam 30, all of which are still linearly polarized in the "S" polarization orientation and all o which are diverted into separate paths. The blue and green beams 74 and 76 in FIG. 1 are shown oriented parallel to each other and orthogonal to the incident beam 30, however, such parallel and orthogonal orientation is not strictly required, as will be described in more detail below. Note also that any three colors that would allow for full color image reproduction could be used just as easily as the blue, green, and red colors shown and described herein. Blue, green, and red have simply become the standard for color video and television imaging systems.

Each of the blue, green, and red beam components 74, 76, 78 has positioned therein a respective LC array 52, 54, 56, as illustrated in FIGS. 1 and 2, for writing the respective blue, green, and red video images into the respective blue, green, and red beam components 74, 76, 78. Array 52 is positioned on that portion of component plane 203 that is between planes 204 and 205. Array 54 is orthogonal to array 52, and is positioned in plane 205 between planes 202 and 203, while array 56 is positioned in plane 202 between planes 205 and 206, as shown in FIG. 1. The blue LC array 52 positioned in the path of the blue beam component 74 imparts changes to portions of the light in the blue beam component 74 on a real time basis such that the resulting blue beam component 84 then carries the blue color component of a video image to be projected on the screen 68 or other visual display device. Likewise, the green LC array 54 imparts an image in the green beam component 86, and the red LC array 56 imparts an image in the red beam component BB.

When the respective blue, green, and red images have been written by respective blue, green, and red LC arrays 52, 54, 56 into blue, green, and red beam components 74, 76, 78, the resulting blue, green, and red image carrying beam components 84, 86, 88, respectively, are recombined by dichroic mirror 69, positioned in plane 209 between planes 204 and 205, and by polarizing beamsplitter recombiner cube 71 (which is bounded by planes 201, 202, and 204, 205) for projection through lens 66 onto a screen 68 or other suitable device. Actually, in the geometry of the preferred embodiment 10, as shown in FIGS. 1 and 2, the blue beam 74 is folded 90 degrees by a mirror 40 positioned in plane 211 between planes 204 and 205, which may be either aluminized or blue dichroic, into the blue LC array 52. The red image carrying beam 88, on the other hand, is folded 90 degrees by a mirror 37 positioned in plane 207 between plane 205 and 206, which may be either aluminized or red dichroic, after emerging from red LC array 56 into cube 71 for advantageous reasons that will be described in more detail below. Dichroic mirror 69 is positioned to allow for the recombination of blue and green image carrying beam components 84, 86.

The blue LC array 52, as well as the green LC array 54 and the red LC array 56, are controlled by LC control electronics 58 to impart the television or video images to the light beams 74, 76, and 78. As will be described in more detail below, the control electronics 58 convert a video input signal 59 from a television receiver or other signal source (not shown) to appropriate LC drive signals required to selectively scan the individual pixels of each LC array 52, 54, 56 to produce the respective blue, green, and red color components of the video image.

Figure 7:
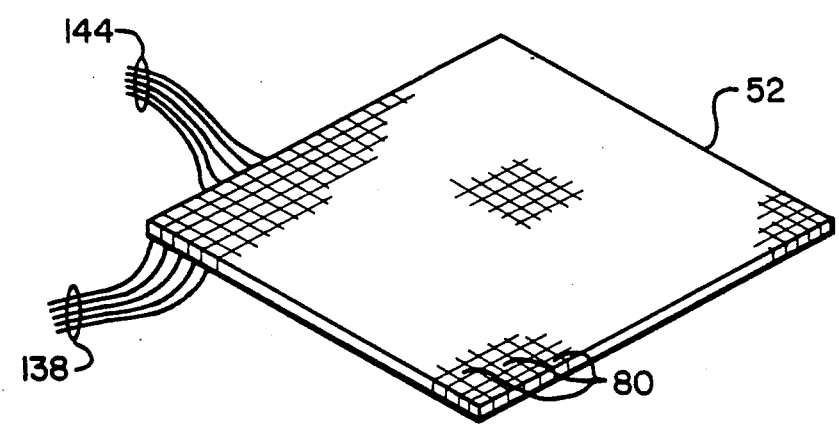
FIG. 7 is a schematic view in perspective of a typical prior art liquid crystal polarization state modulator of the type that may be used to write the visual images in the present invention.

A typical LC array 52 is shown in FIG. 7 and comprises a two dimensional array of individual pixels 80, which are controlled via a plurality of address lines 138 and write lines 144. Such LC arrays are commercially available and are currently used, for example, in the "Crystal Image Projector" (TM) product manufactured by Seiko-Epson. Each such LC array 52 typically comprises about 70,400 pixels in a 220-pixel by 320-pixel rectangular grid. The LC arrays 52 used in this invention could be nematic, twisted nematic, or supertwisted nematic. In all cases these devices pass or block light when used in conjunction with linear polarizers or "analyzers" by rotating a plane of linear polarization, on a pixel by pixel basis, by an amount that is electrically controllable. The nematic liquid crystal comprises long, rod-shaped molecules that exhibit the birefringent characteristics of a uniaxial crystal. It is this birefringence that modifies the polarization of the incoming beam.

Figure 8:
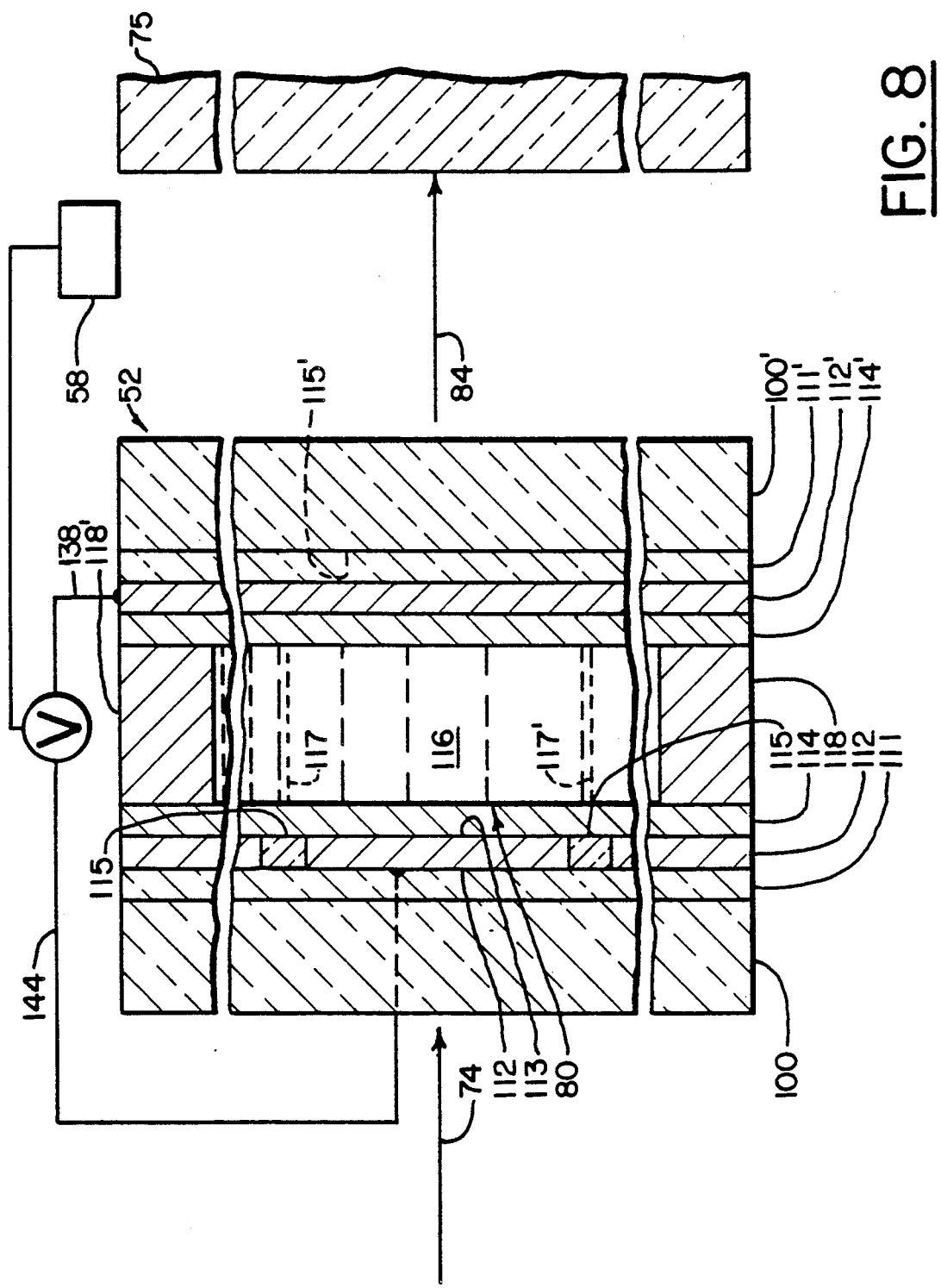
FIG. 8 is a cross-sectional view of a typical pixel section of the liquid crystal polarization state modulator of the type shown in FIG. 7.

A generalized cross-section of a pixel 80 of a typical LC array 52 is shown in FIG. 8 and described herein as background information to assist in the understanding of this invention. Such LC arrays 52, as such, do not form a part of this invention apart from their use as electrically addressable pixel light valve arrays in the color video projector system of this invention. By way of example, the unmodulated blue beam 74 is shown incident on the LC array 52 to be polarization modulated by the pixels, such as pixel 80, into a modulated or image carrying beam 84. Generally, the LC array 52 may be comprised of a transparent substrate 100, such as glass, which can have a layer 111 of a suitable transparent dielectric material, such as silicon dioxide ($SiO_2$), silicon nitride ($SiN_2$), or the like deposited thereon. Patterned portions 113 of the dielectric layer 111 are removed, such as by masked etching, sputtering, or the like, leaving a pattern of insulative dielectric pixel dividers or partitions 115. The removed portions 113 are then refilled by depositing a thin film transparent conducting electrode 112, such as indium tin oxide (ITO), in its place. These patterned strips of transparent electrodes 112 define the addressable pixel electrodes on one side of the LC array 52.

A similar glass substrate 100', dielectric layer 111', and patterned strips of transparent conducting electrode layer 112' are provided to form the opposite electrically addressable electrodes on the opposite side of the LC array 52. The insulative dielectric pixel dividers 115' separating these opposite transparent electrode strips 112' cannot be seen directly in the cross-sectional view of FIG. 8, because they are oriented perpendicular to the pixel dividers 115 on the first side of LC array 52, and they are directly behind and blocked from view by the transparent electrode strip 112'.

An alignment layer 114, typically comprising brushed polyamide, or brushed nylon, is deposited on electrode 112 to properly align the molecules of the liquid crystal 116, and a similar alignment layer 114' is deposited on electrode 112'. A thin layer (a few microns thick) of the liquid crystal (LC) material 116 is sandwiched between the transparent electrodes 112, 112', as illustrated in FIG. 8. Some LC arrays 52 may also have a thin, passivating dielectric film (not shown) that is inert to chemical, electrochemical, or mechanical interaction with the liquid crystal 116 to prevent contamination of the liquid crystal 116. Spacers 118, 118' positioned between the alignment layers 114, 114' around the peripheral edges of the LC array 52 are used to establish the thickness of the layer of liquid crystal 116. Suitable spacers 118, 118' may be made of Teflon, $SiO_2$, or other insulative material, such as Mylar, that is chemically inert so that it does not chemically react with the liquid crystal 116.

A pixel 80 of the liquid crystal 116 is established by the electrode elements 112, 112' approximately between the phantom boundary areas 117, 117', which align approximately with the dielectric dividers 115 between electrodes 112. An electric field or voltage V can be applied across selected pairs of the electrodes 112, 112' via suitable connections 144, 138 to the respective electrodes 112, 112'. When the electrodes 112, 112' are arranged in a grid of patterned strips over the area of the LC array 52, as described above, any pixel 80 of the LC material 116 can be addressed by suitable switching electronics 58, such as multiplexers or the like, to apply a voltage across selected pairs of opposite electrodes 112, 112', in a manner that is well-known by persons skilled in the art, so it is not described herein. The particular LC array 52 structure and construction described above is for example only, and persons skilled in the art will readily recognize that there are numerous other methods and structures for building appropriate LC arrays 52. For example, performance and addressability of individual pixels is often enhanced by p acing a thin film transistor at each pixel location.

Figure 9:
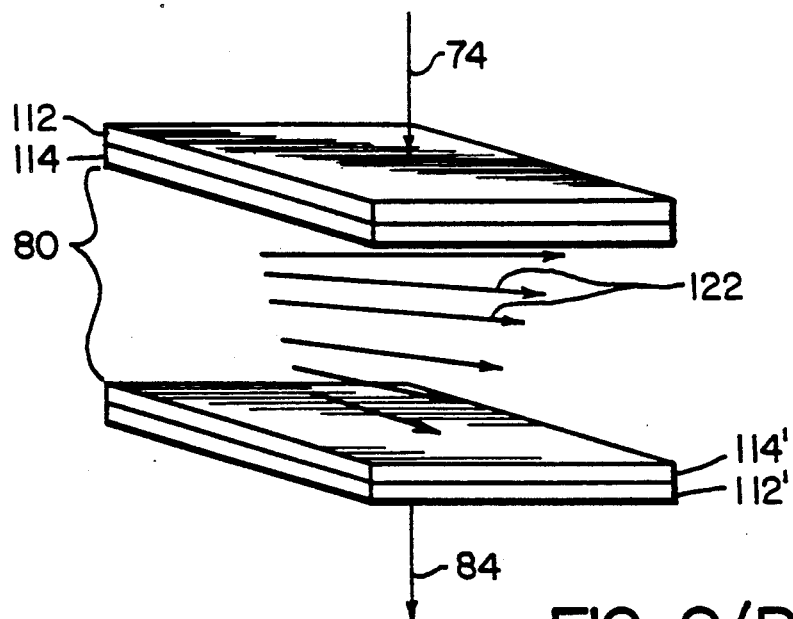
FIG. 9 is a schematic view in perspective of a typical twisted nematic pixel section showing the molecular alignment of the liquid crystal in the absence of an electric field.
Figure 10:
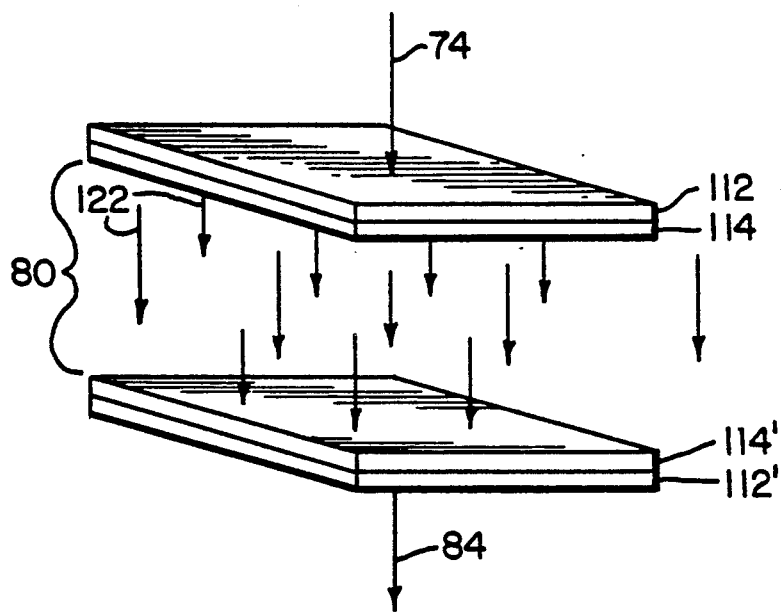
FIG. 10 is a schematic view of the twisted nematic pixel section shown in FIG. 9, but showing the molecular alignment in the presence of an electric field.

FIG. 9 illustrates the basic, off-state operation of a twisted nematic pixel 80, while its on-state operation is illustrated in FIG. 10. Arrows 122 represent the molecular alignment of the liquid crystal in the pixel 80. In the twisted nematic LC array, the long axis direction of the molecules (shown by arrows 122) twists by 90 degrees in moving from one pixel wall or alignment layer 114 to the other 114'. This twist axis is in the direction of travel of the light 74, as shown in FIG. 9. In the case of a supertwisted nematic array (not shown), the twist would be 270 degrees. Other twist configurations are also possible, but the twist and supertwist arrangements are the most common.

In all cases, the orientation of the rod-shaped liquid crystal molecules is controlled by applying an electric field or voltage V along the direction of travel of the light beam 74. This voltage V controls the molecular orientation, because the molecules have a dipolar charge separation, and, consequently, the electric field V applies a torque to them. A change in molecular orientation produces a change in the birefringence (more precisely a change in the orientation of the index ellipsoid). This change results in a corresponding change in the way the liquid crystal pixel 80 modifies the polarization of the incident light beam 74.

Referring again to FIG. 9, with no electric field or voltage V between the electrodes 112, 112', the molecules align with the surface structures 114, 114', which are arranged or "brushed" to give a twisted structure shown by arrows 122. Applying an electric field or voltage V across the electrodes 112, 112' causes the molecules to realign, as shown in FIG. 10, and remove the twist. The optical effect of this change of twist is to rotate the plane of polarization of linearly polarized light 74 passing through the liquid crystal such that the light 84 emerging from the LC pixel 80 is rotated with respect to the plane of polarization of the incident light beam 74.

Generally speaking, then, each LC array 52, 54, 56 (shown in FIGS. 1 and 2) used in the present invention comprise an array of electrically addressable pixel windows 80 or light valves. However, each pixel 80 is not a light valve in the sense that it is capable of blocking or preventing the transmission of light, but rather it is a light valve in the sense that it is capable of twisting, or changing the polarization state of the light passing therethrough, as explained above. For example, each pixel 80 in the LC array 52, 54, 56 of the present invention can rotate the polarization state of light passing through it by 90 degrees when there is no voltage potential V placed across the pixel. If a gradually increasing voltage V is placed across the pixel 80, the molecules of the liquid crystal pixel 80 begin to align themselves in the direction of the electric field V. This alignment change gradually causes the polarization state of light 74 passing through the pixel 80 to return to its normal, or untwisted position. Thus, each pixel 80, depending on the electrical signal or voltage V applied, can selectively rotate or change the polarization state of the light from "P" to "S" or vice-versa. When used in combination with a polarization "analyzer" 75, as illustrated in FIG. 8, to select or transmit light 84 that has a predetermined polarization state, for example either "P" or "S", but not both, each pixel 80 can effectively cause light 84 to be either transmitted or blocked by the analyzer 75. Furthermore, since the amount of twist (the change in polarization angle) changes monotonically with the voltage V applied across the pixel 80, there is a so-called "gray scale" available, i.e., the pixel 80 can gradually cause the light 84 to change from full transmittance to full blockage by the analyzer 75 and back again.

Each pixel 80 in each LC array 52, 54, 56 is selectively scanned by the LC array control electronics 58 very rapidly to produce or "write" a moving picture or video image into the respective blue, green, and red beams 74, 76, 78 of FIGS. 1 and 2. Such scanning electronics 58, as mentioned above, are well-known in the art, and can be found in any of the commercially available portable liquid crystal television receivers, such as those manufactured by the Tandy Corporation. However, a brief description of the LC array control electronics 58 follows in the interest of clarity.

Figure 11:
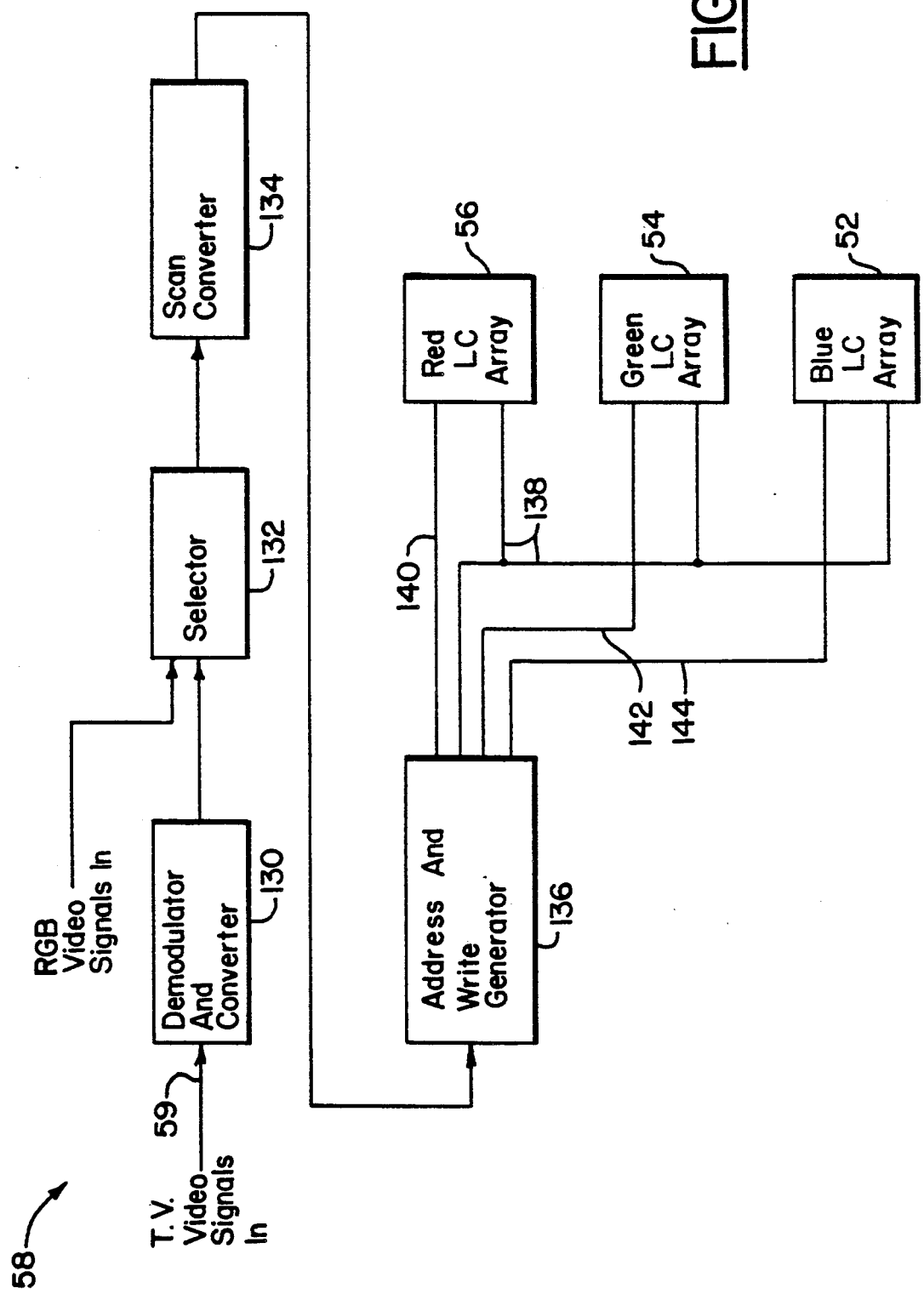
FIG. 11 is a block diagram of the liquid crystal array control electronics of the present invention.

A block diagram of the LC array control 58 is shown in FIG. 11. Broadly speaking, the elements contained in such electronics are as follows. A demodulator and converter 130 translate incoming television or video signals 59 to RGB (red/green/blue) signals. Of course, incoming signals that are already in RGB video signal format, such as those generated by a personal computer, can bypass the demodulator and converter 130 for input directly to selector 132. A scan converter 134 samples the input signal from selector 132 consistent with the raster timing requirements of the LC arrays 52, 54, 56. The signal is then fed to the address and write generator 136, which generates the individual address and write signals necessary for each LC array 52, 54, and 56 to raster the pixels 80, as described above for FIG. 7, to modulate the respective blue, green, and red beams 74, 76, 78 (not shown in FIG. 11, but shown in FIGS. 1 and 2) in such a manner as to create the video images for those respective color components based on the television video or RGB signal. These address and write signals reach the LC arrays 52, 54, 56 via respective red write line 140, green write line 142, and blue write line 144. Address signals in lines 138 common to each LC array 52, 54, 56 enable the selective scanning of individual pixels in each LC array 52, 54, 56.

The pixels 80 of the LC arrays 52, 54, 56, as described above, are scanned in such a way that each pixel is written or caused to modulate the light beam corresponding to the raster pattern represented by the input video or RGB signal. The electronic circuitry used to accomplish this function, as summarized above, is very similar to those used in typical CRT or frame buffer systems and will not be further described herein.

Referring back to FIGS. 1 and 2, the LC arrays 52, 54, and 56 may, depending on their respective optical characteristics (nematic, twisted nematic, or supertwisted nematic), and on the voltage applied to each pixel 80 (FIG. 8), rotate the plane of polarization of the portions of the respective beams 74, 76, 78 that are transmitted through each pixel 80. For example, in the embodiment 10 shown in FIGS. 1 and 2, all of the LC arrays 52, 54, 56 are of the twisted nematic type, which are capable of rotating the plane of polarization anywhere from 0° to 90 degrees, depending on the voltage applied across each pixel 80, as described above. Therefore, in this embodiment 10 of FIGS. 1 and 2, when the control electronics cause a voltage to be applied across a pixel 80 (FIG. 8) of an LC array 52, 54, 56, that pixel 80 will cease to rotate the portion of the S-polarized light beam 74, 76, 78 (polarized perpendicular to the plane of the paper) that is incident on the pixel 80. Conversely, as the voltage across a pixel 80 is removed, the liquid crystal molecules will begin to twist, and pixel 80 will therefore begin to rotate the portion of the S-polarized light beam 74, 76, 78 that is incident on the pixel 80 either partially or entirely to "P" polarization (polarization in the plane of the paper). These pixel portions of the beams 84, 86, 88 that are rotated partially or entirely to "S" polarization emerging from the respective LC arrays 52, 54, 56 carry the respective blue, green, and red components of the video image.

Those pixel portions of the emerging beams 84, 86, 88 in which the "S" plane of polarization is rotated upon emerging from the LC arrays 52, 54, 56, on the other hand, are screened or passed out of the system, as will be described in more detail below, and appear essentially as dark or unlighted spots in the video image. Of course, if a pixel 80 of one LC array, such as the blue LC array 52, rotates that pixel portion of the blue "S" polarized beam 74 incident thereon to "P" polarization, thus screening the blue color from that pixel 80 out of the system, while a correspondingly positioned pixel 80 of, for example, the red LC array 56 does not rotate that pixel portion of the red beam 78 to "P" polarization, then that pixel spot of the composite image projected on the screen 68 will appear red. Similarly, rotation of the corresponding pixel portion of the green beam 76 by a correspondingly positioned pixel 80 in the green LC array 54 will mix green color with the red color in the display on the screen 68. Therefore, as used herein, "image carrying portions," or "image carrying beam" refers to light from the pixels that combines to form a "positive" color image, as opposed to the unwanted portions, which would combine to form a "negative" color image. This is analogous to the concept of "positive" and "negative" as used in photography to describe positive or negative color images on photographic film.

After being polarization modulated by the LC arrays 52, 54, 56 to create video image carrying blue, green, and red beams 84, 86, 88, respectively, each of these video image carrying colored beams 84, 86, and 88 are recombined by dichroic mirror 69 and polarizing beam recombiner cube 71. Polarizing beam recombiner cube 71 is essentially just a polarizing beamsplitting cube, which, as described above, and is available commercially from Meadowlark Optics of Longmont, Colo.

Figure 6:
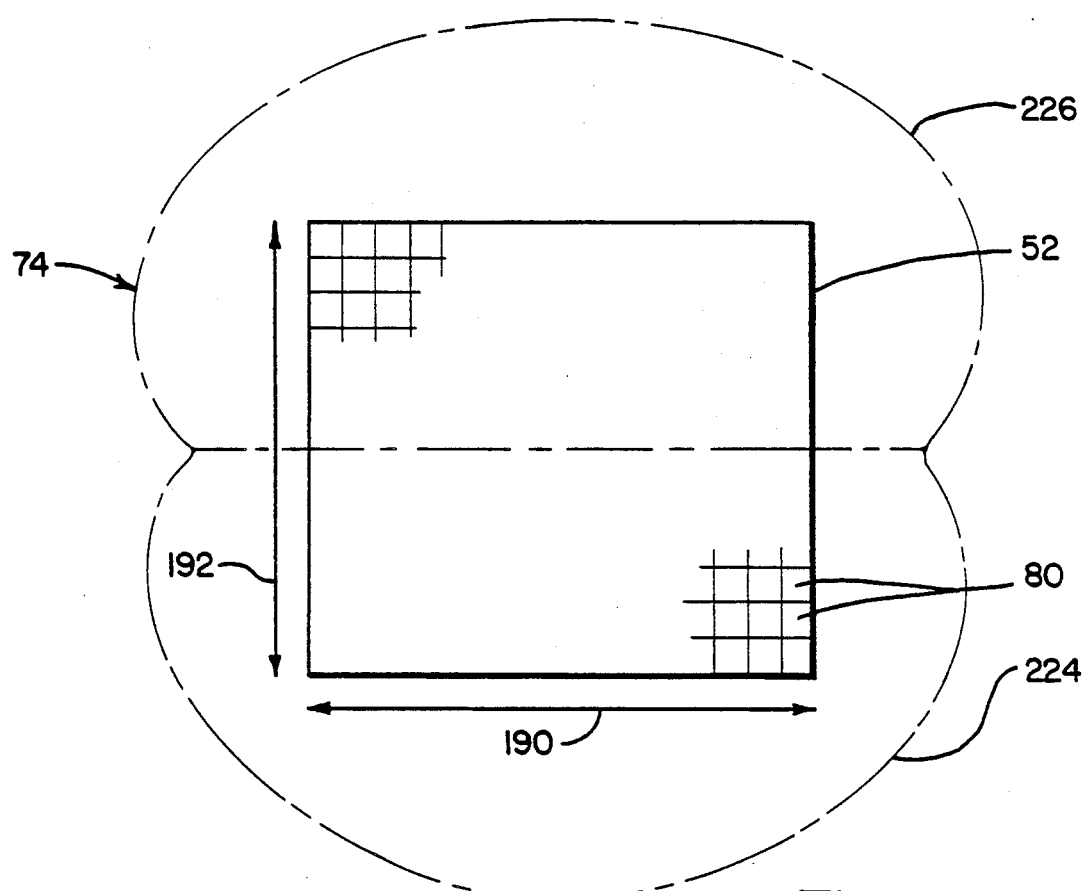
FIG. 6 is a schematic diagram showing the illumination pattern on a typical liquid crystal polarization state modulator of the type that may be used to write the visual images in the present invention.

It is also significant for full light and efficient component utilization of this embodiment that the "aspect ratio" of the rectangular beamsplitter parallelepiped 23, or the ratio of the depth dimension (indicated by arrow 184 in FIG. 2) to either the length dimension (arrow 180), or the height dimension (arrow 182) is approximately 2:1. This feature provides for full, uniform illumination of the LC arrays 52, 54, and 56, as well as for full utilization of all the light in beam 30. Therefore, the aspect ratio of rectangular parallelepiped 23, along with its actual dimensions, is best determined by close coordination with the sizes and aspect ratios (ratio of length to height) of the LC arrays 52, 54, and 56, as illustrated by reference to FIG. 6. A typical LC array, such as LC array 52 is shown in FIG. 6 illuminated by one of the color beams, such as blue beam 74, shown by phantom lines. In reality, blue beam 74, as described above, is oval-shaped as shown in FIG. 6 due to the imperfect collimation of beam 30. As such, blue beam 74 is really a composite beam comprised of a portion 226, which is the blue color portion of the light beam 30 that originated from the originally S-polarized beam 26 in rectangular parallelepiped 23, and a portion 224, which is the blue color portion of the light beam 30 that originated from the originally P-polarized (but now S-polarized due to retarder 33) beam 24 in parallelepiped 23. Thus, each portion 224, 226 of blue beam 74 is of the same aspect ratio as parallelepiped 23 and is preferably sized to illuminate one-half of the surface of the LC array 52. Consequently, with each blue beam portion 224, 226 illuminating opposite halves of the LC array 52 surface, more of the blue light originating from light source 18 is utilized to illuminate entire surface of the LC array 52 than would otherwise be the case. The sizes and aspect ratios (length 190 to height 192) of the LC arrays 52, 56, 56, therefore, are the preferred parameters for setting the aspect ratio of rectangular parallelepiped 23. Note that with the above-described design parameters in mind, it might be desireable in practice to slightly oversize the rectangular parallelepiped 23, thus also slightly oversizing the components 224, 226 of beam 74 so that they combine to slightly over-illuminate the LC array 52. Such over illumination can serve to compensate for any slight optical misalignments in the system, as well as to provide a more even illumination of the edge pixels of the array 52.

Of course, the same sizing and aspect parameters as described above for full utilization of the blue beam 74 for fully illuminating the blue LC array 52 also applies in the same manner to the sizing and aspect parameters for full utilization of the green and red beams 76, 78 for fully illuminating the green and red LC arrays 54, 56, respectively. Therefore it is preferable to use all three LC arrays 52, 54, 56 of the same size and shape, so that the size and aspect ratio of the beamsplitting rectangular parallelepiped 23 fits all of them in the manner described above.

It is also significant that the elongated aspect of the beamsplitting rectangular parallelepiped 23 has the additional benefit of taking more advantage and making better use of the elongated shape and filament 19 of lamp 18, as shown in FIG. 2, which is one of the most common and economically feasible sources of nearly white light available. With the elongated dimension of lamp 18 (indicated by arrow 168 in FIG. 2) and the tungsten filament 19 oriented parallel to the elongated dimension 184 of beamsplitting rectangular parallelepiped 23, more of the light emanating from the filament 19 can be directed to, and transmitted by, beamsplitting rectangular parallelepiped 23 in its naturally elongated, collimated format into the projection system 10 according to this invention. Note that arc lamps also tend to produce an elongated source, which should be aligned as described above for the filament lamp for optimum efficiency.

In operation, the LC modulated blue beam 84, carrying the blue color component of the video image, emerges from the LC array 52 and enters dichroic mirror 69 which transmits the short wavelength blue beam 84. Likewise, the green LC array 54 imparts the green color component of the video image to the green beam 86, as described above, by rotating selected pixel portions of the green beam 86 either partially or entirely to "P" polarization. However, the green beam 86 is reflected by dichroic mirror 69, and is therefore recombined with the transmitted blue beam 84, to form recombined blue and green image carrying beam 90. Such a recombination is referred to herein as a "color recombination," as opposed to a polarization recombination, which will be thoroughly discussed below.

- Similarly, the red S-polarized beam 78 is directed through the red LC array 56, where it is polarization modulated to carry the red color component of the video image. The resulting image carrying red beam 88 is then directed, via mirror 37, through ½-wave retarder 45, into one face 93 of polarizing beam recombining cube 71, which functions both as the "analyzer" for the red image and as the recombining component where the image carrying red beam 88 is recombined with the already recombined blue and green image carrying beam 90. Specifically, the pixels 80 of the red LC array 56, upon the removal of a voltage, as described above for the blue and green LC arrays 52, 54, rotate the plane of polarization of the portion of the S-polarized red beam 78 either partially or wholly toward the orthogonal P-polarized state or plane of polarization, depending on the magnitude of the voltage applied. Those pixel portions of the resulting modulated red light beam 88 that are rotated in this manner toward the "P" polarization state represent the portion of the image that is unwanted. However, the polarized beam recombiner cube 71 is oriented to transmit P-polarized pixel portions, and to reflect the S-polarized pixel portions out of the system. That is, the red image carrying portions would be reflected out of the system by cube 71, which would be the opposite of what is desired.

Put in other words, in order to recombine beam 90 with the red image carrying beam 88, cube 71 must somehow reflect the P-polarized light (the unwanted portion) from beam 88 out of the system, while passing the S-polarized light (the desired portion) to allow beam 88 to be recombined with beam 90. Unfortunately, the characteristics of cube 71 are such that it would reflect the S-polarized light of beam 88 (which is the desired portion), out of the system. Therefore, a ½-wave retarder 45 must be positioned in the red image carrying beam 88 to prevent the S-polarized image carrying portion of the red beam 88 from being reflected out of the system by cube 71. Retarder 45 does this by rotating the polarization components of the red image carrying beam 88 by 90 degrees to form a polarization rotated red image carrying beam 89. That is, the image carrying portion of the beam 88 is changed from S-polarization to P-polarization. This interchange of polarization orientation allows the proper portion of the polarization rotated red image carrying beam 89 to be analyzed by cube 71.

Cube 71 is also used according to this invention as a recombining component for the final recombination of the polarization rotated red image carrying beam 89 with the already recombined blue and green image carrying beam 90 emerging from dichroic mirror 69. For this purpose, recombining cube 71 is positioned between planes 201, 202, and 204, 205, as shown in FIG. 1, such that the polarization rotated red image carrying beam 89 is incident on one face 93, and the blue and green image carrying beam 90 is incident o another face 95 that is orthogonal to face 93. Therefore, for recombining purposes, as the now P-polarized polarization rotated red image carrying beam 89 is transmitted straight through cube 71, as described above, the blue and green image carrying beam 90, which is S-polarized, is reflected in cube 71 into the same path as the transmitted polarization rotated red image carrying beam 89, so that they all emerge together from face 97 of cube 71 as recombined beam 92.

Therefore, the recombined beam 92 emerging from the face 97 of cube 71 comprises a composite of all of the blue, green, and red components of the video image with a theoretical efficiency approaching 100%. The actual efficiency of the system, however, will be something less than this theoretical 100% due to the usual coupling and transmission losses. The recombined composite color video beam 92 can then imaged by a lens system 66 in a conventional manner for projection onto a screen 68 for viewing.

As mentioned above, any type of LC array could be used to accomplish the same function of the twisted nematic LC arrays 52, 54, 56 used in the embodiment shown and described above. Different LC arrays having different polarization directions will merely require different input polarization directions and different analyzer transmission directions. These direction changes can be accommodated by the system of the present invention by the addition of ½-wave retarders, preferably achromatic, to rotate the plane of polarization. The location and orientation of such retarders would be obvious to those having ordinary skill in the art in light of the teaching of this invention.

It is also important to realize that any type of polarization could be used without departing from the spirit and scope of the present invention. That is, the preferred embodiment utilizes linearly polarized light, comprising two orthogonal components, or polarization orientations, S and P. However, other orthogonal forms of polarization could be used just as easily. For example, this invention could utilize circularly polarized light, wherein the two orthogonal components are commonly referred to as right and left. In this case, all that would be required would be to replace those components reacting to linearly polarized light with components that would function identically, but with circularly polarized light. Such component replacements are available, and could be readily substituted by those having ordinary skill in the art.

Another significant feature of the preferred embodiment 10 of the present invention is the compact geometrical arrangement of the various optical components. As is shown in FIG. 1, nearly all of the optical components are oriented in such a manner that they describe eleven positionally related component planes 201-211. Vertical first, second, and third planes 201-203, and tenth plane 210 are orthogonal to horizontal fourth, fifth, and sixth planes 204, 205, and 206, with seventh, eighth, and ninth planes 207, 208, 209, and eleventh plane 211 intersecting the first, second, and third planes 201, 202, and 203 where first, second, and third planes 201, 202, and 203 intersect fourth, fifth, and sixth planes 204, 205, and 206 respectively. Therefore, seventh, eighth, ninth, and eleventh planes 207, 208, 209, and 211 are oriented at substantially forty-five (45) degree angles to planes first, second, third and tenth 201, 202, 203, and 210, as well as to fourth, fifth and sixth planes 204, 205, and 206. This geometrical arrangement provides very short, and identical length light paths for each of the colored beams, thereby reducing the overall physical size and dimensions of the system 10. As was discussed earlier, a short light path from the light source to each LC array is critical in achieving high efficiency, and thus a high brightness of the projected image. This short path length is desirable since it is impossible to perfectly collimate the source beam 14 into a parallel, non-divergent beam. Also, a short light path from the LC array to the output lens is critical for achieving high coupling efficiency and light output for a given output lens size. Moreover, such a compact arrangement is important in utilizing the projector in applications where space is at a minimum, such as in portable video projectors or in the display systems for lap top computers, and the like.

Referring again to FIGS. 1 and 2, the 45 degree placement angle of mirrors 34, 36, 37, 40, and 69 between and among the orthogonal arrangement of LC arrays 52, 54, and 56, contribute to the compactness of the preferred embodiment 10. Additionally, the linear alignment of mirror 40 and mirror 29 along plane 211, as well as the linear alignment of dichroic mirrors 69 and 34 along plane 209, could allow these mirror pairs to be replaced with respective elongated individual mirrors, if desired. That is, mirrors 29 and 40 could be easily replaced with a single elongated aluminized mirror. Alternatively, if a blue dichroic mirror is desired for mirror 40, that portion of the single elongated mirror could be easily made blue dichroic, while the upper portion, which performs the function of mirror 29, could be plain aluminized. Likewise, the linear alignment of dichroic mirrors 34 and 69 allow their replacement by another single elongated dichroic mirror. Such a single mirror would have the top portion green dichroic, while the bottom, or lower portion (i.e., the portion replacing dichroic mirror 69), would be made to function exactly like the recombining dichroic mirror 69. This combining of mirrors not only reduces the number of separate optical components, but simplifies optical alignment and reduces costs as well.

Besides being compact, the arrangement of optical components for the preferred embodiment 10 of the present invention also provides equal and short optical path lengths from the LC arrays 52, 54, and 56 to the focal point of the projection lens system 66, in addition to the equal and short optical path lengths from the light source 12 to the individual LC arrays 52, 54, and 56. These short and equal path lengths enhance the efficiency of the projector, and minimize the effects due to the imperfect collimation of source beam 14.

Finally, it should be noted that properly oriented crystalline polarizers, rather than the stacked coatings could be used for the polarization-selective surfaces used by this invention.

Figure 3:
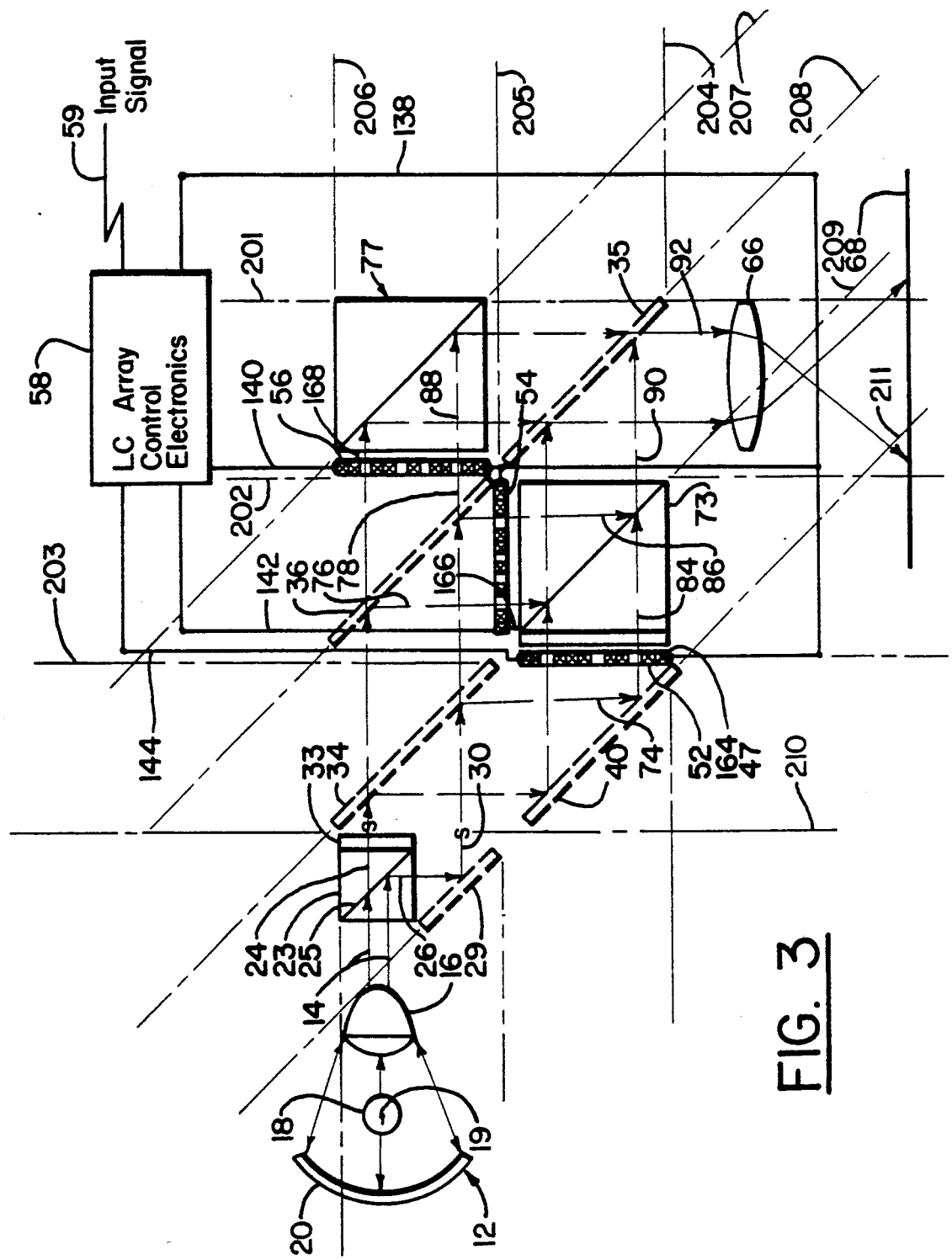
FIG. 3 is a schematic diagram showing the positionally related component planes, relevant optical paths, and polarization orientations of a second embodiment of the polarized color video projector of the present invention.
Figure 4:
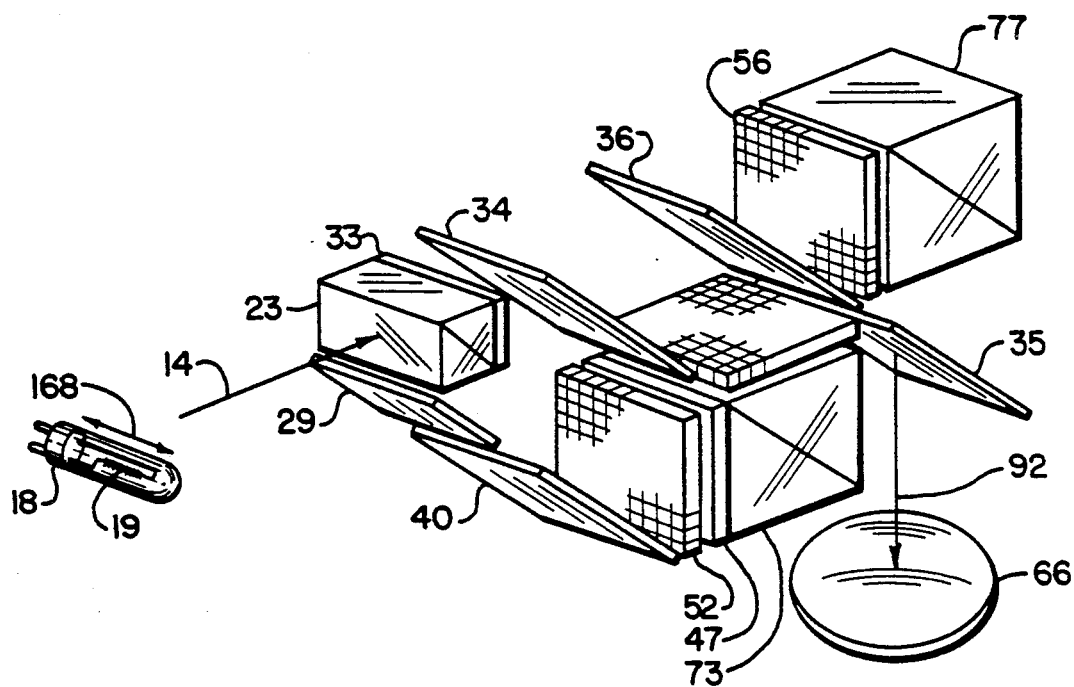
FIG. 4 is a perspective view of the principal optical components of the second embodiment of the polarized color video projector shown in FIG. 3.

A second embodiment 15 of the present invention is shown in FIGS. 3 and 4 which varies somewhat from the first embodiment shown in FIGS. 1 and 2. Specifically, this second embodiment 15 replace the dichroic mirror 69 of the first embodiment with a polarizing beam recombiner cube 73, mirror 37 with a second polarizing beam recombiner cube 77, and polarizing beam recombiner cube 71 with dichroic mirror 35.

Referring now to FIG. 3, a detailed description of the differences between the projector 1 and the projector 15 of the present invention is provided with respect to the same eleven positionally related component planes 201-211 that were used in describing the first embodiment 10. As was briefly described above, note that the beam 14 from light source 12 is now parallel to the linearly polarized beam 30, as opposed to being orthogonal to beam 30 as was the layout for the first embodiment shown in FIG. 1. This different orientation demonstrates that a number of different configurations are possible for projecting the collimated light beam 14 onto polarizing beamsplitter cube 23. In both cases, cube 23, retarder 33, and mirror 29 are arranged to provide an output beam 30 that is linearly polarized in the "S" orientation. Not also that the number of beam lines shown in FIG. 3 is reduced from the number shown in FIG. 1 in the interest of clarity. However, enough beam lines remain in FIG. 3 to clearly show the beamsplitting and recombination that occurs in the system.

The linearly polarized white light beam 30 is sorted or separated into blue, green, and red component beams 74, 76, and 78, respectively, by blue and green dichroic mirrors 34 and 36 positioned sequentially in the path of beam 30 on plane 209 between planes 205 and 206, and on plane 208 between planes 205 and 206, respectively, as was explained for the first embodiment 10. Likewise, blue, green, and red LC arrays 52, 54, and 56, positioned in each respective colored beam component 74, 76, and 78, write the video image onto each colored beam component. After the respective blue, green, and red images have been written by respective blue, green, and red LC arrays 52, the blue, green, and red image carrying beams 84, 86, and 88 are recombined by polarizing beam recombiner cube 73 and dichroic mirror 35.

The blue LC array 52, positioned on plane 203 between planes 205 and 205, imparts the blue color component of the video image to the blue beam 86, as described above. However, since the cube 73, positioned between planes 202, 203, and 204, 205, reflects S-polarized light and transmits P-polarized light, it is necessary to rotate the plane of polarization of the desired picture component (which is S-polarized) of the modulated blue beam 84 by 90 degrees. Such rotation, of course, causes the S-polarized pixel portions of blue beam 84 emerging from LC array 52 to become P-polarized, and it causes the unwanted P-polarized pixel portions of the blue beam 84 emerging from LC array 52 to become S-polarized. Thus, the initially S-polarized pixel portions of the blue beam 84 that are carrying the blue component of the video image are rotated to P-polarization, so that they are transmitted in the polarizing beam recombiner cube 73.

The LC modulated green beam 86, carrying the green color component of the video image, emerges from the LC array 54 located on plane 205 between planes 202 and 203, and enters the polarizing beam recombiner cube 73. Those pixel portions of the beam 86 that are modulated to S-polarization are reflected by the cube 73, because the cube 73 is oriented such that it transmits the light that is P-polarized and reflects light that is S-polarized, which, as described above, is a characteristic of this kind of device. Consequently, the cube 73 acts as a polarization analyzer for both the modulated blue beam 84 and the modulated green beam 86. Thus, the S-polarized pixel portions of the green beam 86 that are carrying the green component of the video image are reflected in the polarizing beam recombiner cube 73 to the same direction of propagation as the transmitted P-polarized (previously S-polarized, but now P-polarized due to retarder 47) pixel portions of the blue beam 84, thereby forming a recombined blue and green image carrying beam 90. At the same time, the unwanted P-polarized pixel portions of the green beam 86 are transmitted through cube 73 to join the reflected reoriented S-polarized pixel portions (i.e., now the unwanted portions) of the blue beam 84 in being expelled from the system.

As was discussed above, this 90-degree reorientation of the modulated blue beam 84 can be accomplished by placing a ½wave retarder plate 47 or similar device between blue LC array 52 and cube 73. Alternatively, a nematic LC array with a different twist angle could be substituted for the LC array 52, which would rotate light passing through the pixels 80 to the desired polarization orientation, thus eliminating the need for the ½wave retarder 47 to perform that additional rotation.

In a like manner, the red S-polarized beam 78 is directed through the red LC array 56 positioned on plane 202 between planes 205 and 206, where it is polarization modulated to carry the red color component of the video image. The resulting image carrying red beam 88 is then directed into a second polarizing beam recombiner cube 77, positioned between planes 201, 202, and 205, 206, which functions as an analyzer for the red image carrying beam 88. Cube 77 reflects the S-polarized pixel portions of beam 88, and transmits the unwanted P-polarization components out of the system. This analyzed red image carrying beam 88 is then recombined with the recombined blue and green image carrying beam 90 by dichroic mirror 35, which transmits red light and reflects the shorter wavelength green and blue light. This recombined beam 92 comprises a composite of all of the blue, green, and red components of the video image, and is imaged by a lens system 66 in a conventional manner for projection onto a screen 68 for viewing.

Figure 5:
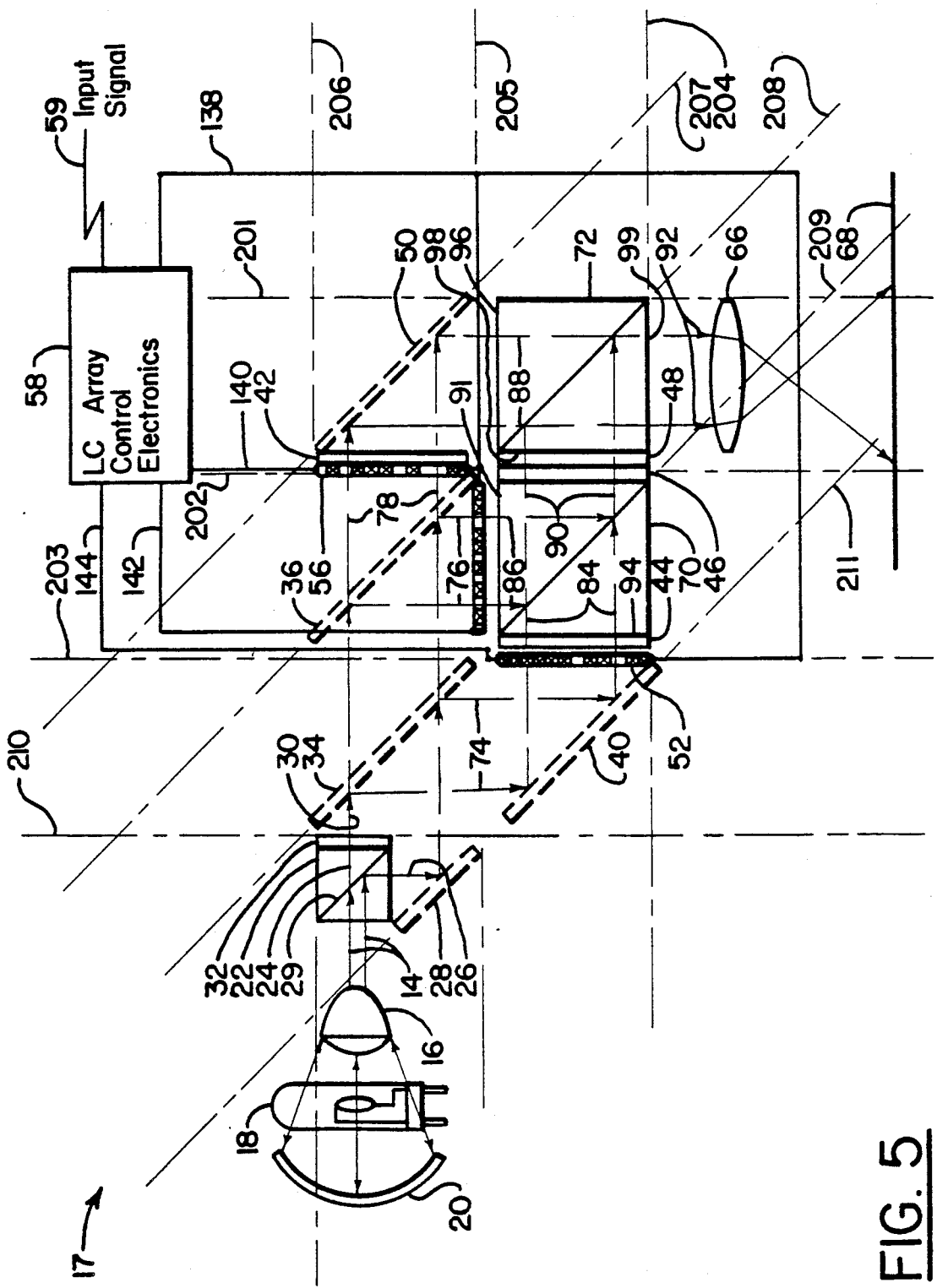
FIG. 5 is a schematic diagram showing the positionally related component planes, relevant optical paths, and polarization orientations of a third embodiment of the polarized color video projector of the present invention.

A third embodiment 17 of video projection system of the present invention is shown in FIG. 5 and demonstrates yet another configuration for the video projection apparatus of the present invention. As was the case for the first two embodiments 10 and 15, the arrangement of the optical components of this third embodiment 17 also describe eleven positionally related component planes 201–211. Referring now to FIG. 5, a tungsten filament lamp or arc lamp or similar lamp 18 equipped with a spherical, elliptical, or parabolic reflector 20, and a light condenser and collimator 16 can be used to produce a collimated white light beam 14. The collimated light beam 14 is directed to a polarizing beamsplitter cube 22, which has one beam output 24 linearly polarized in the "P" orientation i.e., parallel to the plane of the paper, and a second beam output portion 26 linearly polarized in the "S" orientation, the "S" orientation being orthogonal to the plane of polarization of the first beam output portion 24, i.e., in a plane perpendicular to the plane of the paper. As for the first and second embodiments 10 and 15, polarized beamsplitter 22 has a polarization-sensitive surface 29 that transmits light that is linearly polarized in one direction or plane and reflects light that is linearly polarized in one direction or plane and reflects light that is linearly polarized in another direction or plane. It also functions to convert an unpolarized beam 14 into two linearly polarized components, such as the P-polarized and S polarized orientations described above. In this example embodiment 17, the "P"-polarized beam portion 24 is transmitted axially through polarizing beamsplitter cube 22, and the "S" polarized beam portion 26 is reflected to emerge from the polarizing beamsplitter cube 22 orthogonal to the axis of the input beam 14.

As before, both output beam portions 24, 26 are utilized by rotating the plane of polarization of one of them to match the other and putting them together in parallel relation to each other. In this embodiment 17, the output beam portion 24 is rotated 90 degrees by an achromatic ½ wave retarder plate 32 positioned adjacent the polarizing beamsplitter cube 22 in the path of the emerging beam portion 24 so that its plane of polarization is rotated to the "S" direction, i.e., perpendicular to the plane of the paper, to match the "S" polarization orientation of beam 26.

Referring back to FIG. 5, the S-polarized output beam portion 26 is reflected by specular mirror 28, positioned on plane 211 between planes 205 and 206 in a direction parallel to beam portion 24 to form, along with the rotated beam portion 24, a full beam 30 having its entire linear polarization oriented in the "S" direction.

The linearly polarized white light beam 30 is then sorted or separated into blue, green, and red component beams 74, 76, and 78, respectively, by blue and green dichroic mirrors 34 and 36 positioned sequentially in the path of beam 30 on planes 209 and 208, respectively. The three separate beams, i.e., blue beam 74, green beam 76, and red beam 78, are still linearly polarized in the "S" polarization orientation and are diverted into separate paths Each of the blue, green, and red beam components 74, 76, 78 has positioned therein a respective LC array 52, 54, and 56 along planes 203, 205, and 202, as shown in FIG. 5, for writing the respective blue, green, and red video images into the respective blue, green, and red beam components 74, 76, 78. As before, the blue LC array 52 positioned in the path of the blue beam component 74 imparts changes to portions of the light in the blue beam component 74 on a real time basis such that the resulting blue beam component 84 then carries the blue color component of a video image to be projected on the screen 68 or other visual display device. Likewise, the green LC array 54 imparts an image in the green beam component 86, and the red LC array 56 imparts an image in the red beam component 88.

When the respective blue, green, and red images have been written by respective blue, green, and red LC arrays 52, 54, 56 into blue, green, and red beam components 84, 86, 88, the resulting blue, green, and red image carrying beam components 84, 86, 88, respectively, are recombined in polarizing beamsplitter recombining cubes 70, 72 for projection through lens 66 onto a screen 68 or other suitable device. Actually, as shown in FIG. 5, the blue beam 74 is folded 90 degrees by a second mirror 40 located on plane 211 between planes 204 and 205, which may also be either aluminized or blue dichroic, into the blue LC array 52, which is positioned in front of one face 94 of a polarizing beamsplitter cube 70. The beamsplitter cube 70 is positioned in the are defined by planes 202, 203 and 204, 205, and has adjacent orthogonal faces 94, 91 aligned with the respective paths of blue and green beam components 74, 76. A ½-wave retarder plate 44 separates the LC array 52 from cube 70 to rotate the S-polarized image carrying component of the blue beam to the P orientation so that it will be transmitted by beamsplitter cube 70. The blue beam 84 and green beam 86 are then recombined by beamsplitter cube 70 in exactly the same way as they were in the second embodiment 15. That is, beamsplitter cube 70 transmits P-polarized light and reflects S-polarized light to recombine those S-polarized pixel portions of the modulated green beam 86 with the now P-polarized (due to retarder 44) image carrying pixel portions of the blue beam 84. Of course, as was the case for the first two embodiments 10 and 15, the ½-wave retarder plate 44 of this embodiment could be eliminated by substituting a nematic LC array having a different twist angle for LC array 52, which would rotate light passing through the pixels 80 to the desired polarization orientation. The point with both the second and third embodiments 15 and 17 is that the polarization state of the desired image carrying pixel portions of the respective blue and green modulated beams 84, 86 must be orthogonal to each other to be recombined efficiently in cube 70, and there are a number of devices and techniques available in the art to accomplish this orientation.

Similarly, the red S-polarized beam 78 is directed through the red LC array 56 located on plane 202 between planes 205 and 206, where it is polarization modulated to carry the red color component of the video image. The polarization of the resulting image carrying red beam is rotated 90 degrees by ½-wave retarder 42, and is then directed, via mirror 50 on plane 207, into one face 96 of another polarizing beam recombining cube 72, which functions both as the "analyzer" for the red image and as the recombining component where the image carrying red beam 88 is recombined with the already recombined blue and green image carrying beam 90. However, since beamsplitting cube 72 is oriented to transmit P-polarized light, the S-polarized image carrying portion of the red beam must be converted to P-polarization by retarder 42 so that they can be combined with the blue and green beams.

In other words, the cube 72 transmits P-polarized light and reflects S-polarized light, which is the basis for its red beam "analyzer" function. However, this cube 72 is also used according to this embodiment 17 as a recombining component for the final recombination of the red image carrying beam 8 with the already recombined blue and green images carrying beam 90 emerging from cube 70. For this purpose, recombining cube 72 is positioned such that the red image carrying beam 88 is incident on one face 96, and the blue and green images carrying beam 90 is incident on another face 98 that is orthogonal to face 96. Therefore, for recombining purposes, as the now P-polarized red image carrying beam 88 is transmitted straight through cube 72, as described above, the blue and green images carrying beam 90 has to be reflected in cube 72 into the same path as the transmitted red image carrying beam 88, so that they all emerge together from face 99 of cube 72.

There would, under conventional prior art circumstances, still be a problem in recombining the red image carrying beam 88 with the blue and green images carrying beam 90 in this manner, since, for reflection in cube 72, as described above, the polarization state of the desired picture elements of the blue and green portions of beam 90 have to be S-polarized. However, because of the "analyzing" and the recombination of the blue and green images carrying components of blue and green modulated beams 84, 86, respectively, in cube 70, as described above, the green portions of beam 90 are still polarized orthogonal to the polarization state of the blue portions. Specifically, in the example described above, the blue image carrying portions of beam 90 were P-polarized for "analyzing" and transmission through cube 70, while the green image carrying portions of beam 90 were S-polarized for "analyzing" and reflection in cube 70 into the path of the blue portions for recombination into beam 90. Therefore, while the "P" polarization of the red image carrying beam 88 is correctly oriented to be transmitted by cube 72, and the green portion of the recombined beam 90 is also correctly S-polarized for reflection by cube 72, the blue component of the beam 90 emerging from cube 70 is still P-polarized. As such, the blue component of beam 90 would be transmitted straight through cube 72 and out of the system, instead of being reflected, along with the green component, into the path of the transmitted red beam 88 for emergence together from face 99 of cube 72.

Therefore, a significant feature of this embodiment 17 to solve this problem is the use of a multiwave retarder 46 positioned in the path of recombined blue and green images carrying beam 90 between cube 70 and cube 72 for rotating only the P-polarized blue component 90 degrees to the S-polarized state, while leaving the S-polarized green component of beam 90 substantially unchanged. Consequently, with both the blue and green components of beam 90 emerging from the multiwave retarder 46 being S-polarized, they will both be reflected in the polarizing beam recombining cube 72. At the same time, the red beam 88 entering the cube 72 is transmitted straight through cube 72 to result in the recombination of all three of the blue, green, and red image components in cube 72. Therefore, the recombined beam 92 emerging from the face 99 of cube 72 a comprises a composite of all of the blue, green, and red components of the video image. The recombined composite color video beam 92 can then imaged by a lens system 66 in a conventional manner for projection onto a screen 68 for viewing.

As mentioned above, a significant feature of this embodiment 17 of the polarized color video projection system is the use of multiwave retarder 46 in beam 90, which makes possible the recombination of all three color components in polarizing beam recombining cube 72. A multiwave retarder is an optical device that effectively retards the slow axis component of all the wavelengths of light that are significant to this application by about the same amount. The multiwave retarder 46 used in the example embodiment of this invention as described above is a birefringent device that retards the slow axis component of the light wave of both the blue and green components of beam 90 emerging from cube 70 by about 1130 nm. Therefore, for green light (about 550 nm wavelength), the multiwave retarder 46 is effectively about a 2-wave retarder (1130% 550=2.05), while for blue light (about 450 nm wavelength), the multiwave retarder 46 is effectively about a $2\frac{1}{2}$ wave retarder (1130% 450=2.51). A retardation of n wavelengths, where n is an integer, i.e., 0, 1, 2, 3, . . . , n wavelengths, results in no effective rotation of the plane of polarization. On the other hand, a retardation of $m+\frac{1}{2}$ wavelength(s), where m is an integer, i.e., $\frac{1}{2}$, $1\frac{1}{2}$, $2\frac{1}{2}$, $3\frac{1}{2}$, . . . , $n\frac{1}{2}$ wavelengths, results in a 90-degree rotation of the plane of polarization, if the direction of the optical axis of the retarder is at a 45 degree angle to the direction of the input linear polarization. Therefore, the result of the 1130 nm multiwave retarder 46 used in the example of this embodiment 17 is that the plane of polarization of the green light emerging from the multiwave retarder 46 is virtually unchanged from the incident green light, whereas the plane of polarization of the blue light emerging from the multiwave retarder 46 is effectively rotated 90 degrees from the incident blue light. Consequently, the polarization states of both the green and blue components of beam 90 emerging from multiwave retarder 112, are therefore S-polarized, which are reflected in cube 72 to recombine with the red beam 88, as described above. Such multiwave retarders 46 are available commercially from Meadowlark Optics of Longmont, Colorado.

Note that throughout this description red, green, and blue have been used to refer to the colors of the individual light beams. It should be understood that the term "red" as used herein, does not describe only one particular wavelength of light commonly considered to be red. Rather, the term "red" refers to an entire range of wavelengths present in the red light, which wavelengths commonly produce red colored light. That is, the light is not monochromatic. This definition also applies to the terms "green" and "blue" as used herein, as well as the term "wavelength." That is, all terms should be regarded as including a range of wavelengths of light falling within the specified color range.

It should also be remembered that the "coupling" inefficiencies referred to herein apply to both the so-called "front end" (i.e., from the source to the LC arrays) and "back end" (i.e., from the LC arrays to the output lens) of the optical system. That is, anytime light passes from one optical component to another, a certain amount of light is always lost in the transfer. These coupling losses make it important to keep the lengths of the various optical paths to a minimum for maximum efficiency.

Moreover, any type of LC array could be used to accomplish the same function of the twisted nematic LC arrays 52, 54, 56 used in the embodiments shown and described above. Different LC arrays having different polarization directions will merely require different input polarization directions and different analyzer transmission directions. These direction changes can be accommodated by the system of the present invention by the addition of ½-wave retarders, preferably achromatic, to rotate the plane of polarization. The location and orientation of such retarders would be obvious to those having ordinary skill in the art in light of the teaching of this invention.

The light paths and optical components can be arranged differently within the scope of this invention. For example, rather than combining the blue and green modulated beams first and then recombining with the red beam, as described for the third embodiment 17 above, any two of the three colors can be recombined first before recombining with the remaining color. Such rearrangement would require a different retarder value for the multiwave retarder 46 to get the planes of polarization of the first two recombined colors, whatever they are chosen to be, to match before entry into the recombining cube 72 for recombination with the third color. Also, by merely reversing the P and S orientation of the planes of polarization of beams 88 and 90, the beam 90 can be transmitted straight through cube 72 and the beam 88 can be reflected. This same kind of rearrangement can be made with cube 70. Such obvious reorientations and rearrangements are considered to be equivalents for purposes of this invention.

While a number of specific optical components were described above for the first, second, and third embodiments 10, 15, and 17 of this invention, persons skilled in this art will readily recognize that other substitute components or combinations of components may be available now or in the future to accomplish comparable functions to make video projection apparatus according to this invention. For example, arrays of microscopic, electrically actuated mechanical shutters, such as those developed by Texas Instruments, Inc., (not shown) could be used to modulate or "write" the blue, green, and red video images into the blue, green, and red beams 74, 76, 78 instead of the LC arrays 52, 54, 56 described above. However, since such mechanical shutters do not rotate the plane of polarization of the incident light, it would be necessary, e.g., in the third embodiment 17, to interchange spacer 44 with ½-wave retarder plate 42 to properly recombine the blue and green components of beam 90. It would also be necessary to remove ½-wave retarder plate 50 to correctly orient the polarization of the red image carrying beam 88.

It would also be possible to replace the light source 12, beamsplitter cube 22 or 23, mirror 28 or 29, and dichroic mirrors 34 and 36, with three individual lasers, or other monochromatic sources, to generate the blue, green, and red color beams 74, 76, 78. The beams from each laser would then be expanded and collimated before directing them to the respective LC arrays. The optical apparatus necessary to accomplish the laser beam spreading and collimation are well known in the art. Further, while the planes of polarization in the third embodiment 17 above have been described as being orthogonal, and that is the preferred format for convenience and for conventional use of the polarizers and retarders utilized, other formats are possible. For example, a half-wave retarder that has its fast axis oriented at a 45 angle to the plane of polarization of the incident light will effectively reorient the plane of the linearly polarized light by 90-degrees. The uses of retarders in the example embodiment described above have this orientation. However, in a more general sense, the direction or orientation of the emerging linearly polarized light is mirrored about the fast axis of the half-wave retarder. Thus, for example, an angle of 15-degrees between the fast axis and the plane of polarization of the incident light results in the emerging light oriented with its plane of polarization 15-degrees to the opposite side of the fast axis, thereby resulting an effective rotation or reorientation of the plane of polarization by 30-degrees. Thus, ½-wave retarders can be used to rotate planes of polarization to any degree desired. Consequently, with varying orientations of the retarders and other optical components, this invention could be practiced with respective planes of polarization oriented other than in the "S" and "P" orthogonal planes described above.

Other possible substitutes have been mentioned throughout this description, and many more equivalents are possible. Therefore, it would be feasible to someone having ordinary skill in the art, in light of this disclosure, to assemble the necessary components to practice this invention, regardless of whether some of such components might not be the same as those described above.

The compact sizes of the video projection systems 10, 15, and 17 of the present invention also allows them to easily replace any type of CRT display system. For example, a highly miniaturized system according to this invention need not necessarily be used for so-called "big screen" television systems, but could also replace CRT computer display terminals. Such a system could, for example, utilize miniaturized LC arrays and projection optics to project the image onto a viewing display. Many other such uses and modifications are possible which would readily occur to those of ordinary skill in the art.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be considered as falling within the scope of the invention as defined by the claims which follow.

- The embodiments of the invention in which an exclusive property or privilege is claimed are defined as follows:

1. Color video projector apparatus, comprising a structural geometry oriented in a manner that describes nine positionally related component planes, including:
   first, second, and third planes positioned substantially parallel to each other and with adjacent ones of those first, second, and third planes positioned approximately equidistant apart;
   fourth, fifth, and sixth planes positioned substantially parallel to each other and perpendicularly intersecting said first, second, and third planes, adjacent ones of said fourth, fifth, and sixth planes being positioned approximately the same distance apart as the distance between adjacent ones of said first, second, and third planes;
   a seventh plane positioned to intersect said first and second planes where said first and second planes intersect said fifth and sixth planes, respectively; an eighth plane positioned to intersect said first, second, and third planes where said first, second, and third planes intersect said fourth, fifth, and sixth planes, respectively; and a ninth plane positioned to intersect said second and third planes where said second and third planes intersect said fifth and sixth planes, respectively, such that said seventh, eighth, and ninth planes are parallel to each other and are oriented at substantially 45-degree angles to said first, second, and third planes as well as to said fourth, fifth, and sixth planes;

first transmissive light valve means with an incident surface positioned in said third plane between said fourth and fifth planes for modulating a first color light beam being transmitted therethrough;

second transmissive light valve means with an incident surface positioned in said fifth plane between said second and third planes for modulating a second color light beam being transmitted therethrough;

third transmissive light valve means with an incident surface positioned in said second plane between said fifth and sixth planes for modulating a third color light beam being transmitted therethrough;

first color light source means for creating said first color light beam and directing it to the incident surface of said first transmissive light valve means;

second color light source means for creating said second color light beam and directing it to the incident surface of said second transmissive light valve means;

third color light source means for creating said third color light beam and directing it to the incident surface of said third transmissive light valve means;

first beam combining means positioned in said ninth plane between said second and third planes for combining said first color light beam emerging from said first transmissive light valve means with said second color light beam emerging from said second transmissive light valve means to create a combined first and second colors light beam directed between and substantially parallel to said fourth and fifth planes;

second beam combining means positioned in said eighth plane between said fourth and fifth planes for combining said third color light beam emerging from said third transmissive light valve means with said combined first and second colors light beam to create a first, second, and third colors light beam; and first light redirecting means positioned in said seventh plane between said fifth and sixth planes for redirecting said third color light beam into said second beam combining means.

2. The color video projector apparatus of claim 1, wherein said first color light source means, said second color light source means, and said third color light source means create said first color light beam, said second color light beam, and said third color light beam polarized in a first plane of polarization, and said first transmissive light valve means, said second transmissive light valve means, and said third transmissive light valve means modulate said first color light beam, said second color light beam, and said third color light beam, respectively, by rotating selected pixel portions of said respective first color light beam, said second color light beam, and said third color light beam toward a second plane of polarization.

3. The color video apparatus of claim 2, wherein said first beam recombining means includes a dichroic mirror that transmits said first color light beam and reflects said second color light beam.

4. The color video apparatus of claim 3, wherein said second beam recombining means includes a polarization selective surface that either reflects or transmits light polarized in said first plane of polarization and, oppositely, either transmits or reflects light polarized in said second plane of polarization.

5. The color video apparatus of claim 4, including retarder means positioned in either the path of said combined first and second colors beam or said third color beam for effectively rotating the plane of polarization of one with respect to the other such that light in the first plane of polarization is effectively rotated to the second plane of polarization and vice versa.

6. The color video apparatus of claim 5, wherein said structural geometry also includes a tenth plane positioned substantially parallel to said third plane and spaced about the same distance apart from said third plane as said second plane is spaced from said third plane, but on the opposite side, and an eleventh plane positioned substantially parallel to said ninth plane and about the same distance from said ninth plane as said eighth plane is from said ninth plane, but on the opposite side, and wherein said first color light source means includes a first color dichroic mirror positioned in said ninth plane between said third and tenth planes, and second light redirecting means positioned in said eleventh plane between said fourth and fifth planes for redirecting said first color light beam to said first transmissive light valve means, and wherein said second color light source means includes a second color dichroic mirror positioned in said eighth plane between said second and third planes 7. The color video projector apparatus of claim 6, wherein said first color light source means, said second color light source means, and said third color light source means all comprise together a polarization selective surface positioned parallel to, and about midway between said ninth and eleventh planes and between said fifth and sixth planes, a spectral mirror in said eleventh plane adjacent said fifth plane, and a retarder between said polarization selective surface and said first color dichroic mirror, and a substantially white light source positioned adjacent said polarization selective surface.

8. The color video projector apparatus of claim 2, wherein said first light redirecting means includes a polarization selective surface that either reflects or transmits light polarized in said first plane of polarization and, oppositely, either transmits or reflects light polarized in said second plane of polarization.

9. The color video projector apparatus of claim 8, wherein said first beam recombining means includes a polarization selective surface that either reflects or transmits light polarized in said first plane of polarization and, oppositely, either transmits or reflects light polarized in said second plane of polarization.

10. The color video projector apparatus of claim 9, wherein said second beam recombining means includes a dichroic mirror that transmits said third color light beam and reflects said combined first and second colors light beam.

11. The color video apparatus of claim 10, including retarder means positioned in either the path of said first color light beam or said second color light beam for effectively rotating the plane of polarization of one with respect to the other such that light in the first plane of polarization is effectively rotated to the second plane of polarization and vice versa.

12. The color video apparatus of claim 11, wherein said structural geometry also includes a tenth plane positioned substantially parallel to said third plane and spaced about the same distance apart from said third plane as said second plane is spaced from said third plane, but on the opposite side, and an eleventh plane positioned substantially parallel to said ninth plane and about the same distance from said ninth plane as said eighth plane is from said ninth plane, but on the opposite side, and wherein said first color light source means includes a first color dichroic mirror positioned in said ninth plane between said third and tenth planes, and second light redirecting means positioned in said eleventh plane between said fourth and fifth planes for redirecting said first color light beam to said firs transmissive light valve means, and wherein said second color light source means includes a second color dichroic mirror positioned in said eighth plane between said second and third planes.

13. The color video projector apparatus of claim 12, wherein said first color light source means, said second color light source means, and said third color light source means all comprise together a polarization selective surface positioned parallel to, and about midway between said ninth and eleventh planes and between said fifth and sixth planes, a spectral mirror in said eleventh plane adjacent said fifth plane, and a retarder between said polarization selective surface and said spectral mirror, and a substantially white light source positioned adjacent said polarization selective surface.

14. The color video projector apparatus of claim 2, wherein said first and second beam recombining means includes a polarization selective surface that either reflects or transmits light polarized in said first plane of polarization and, oppositely, either transmits or reflects light polarized in said second plane of polarization.

15. The color video projector apparatus of claim 14, including multiwave retarder means positioned in the path o said combined first and second colors beam for reorienting the plane of polarization of one of the colored beams in said combined first and second colors beam with respect to the other one of the colored beams in said combined first and second colors beam such that light in the first plane of polarization is effectively rotated to the second plane of polarization and vice versa.

16. The color video projector apparatus of claim 15, including retarder means positioned in either the path of said first color light beam or said second color light beam for effectively rotating the plane of polarization of one with respect to the other such that light in the first plane of polarization is effectively rotated to the second plane of polarization and vice versa.

17. The color video apparatus of claim 16, wherein said structural geometry also includes a tenth plane positioned substantially parallel to said third plane and spaced about the same distance apart from said third plane as said second plane is spaced from said third plane, but on the opposite side, and an eleventh plane positioned substantially parallel to said ninth plane and about the same distance from said ninth plane as said eighth plane is from said ninth plane, but on the opposite side, and wherein said first color light source means includes a first color dichroic mirror positioned in said ninth plane between said third and tenth planes, and second light redirecting means positioned in said eleventh plane between said fourth and fifth planes for redirecting said first color light beam to said first transmissive light valve means, and wherein said second color light source means includes a second color dichroic mirror positioned in said eighth plane between said second and third planes.

18. The color video projector apparatus of claim 17, wherein said first color light source means, said second color light source means, and said third color light source means all comprise together a polarization selective surface positioned parallel to, and about midway between said ninth and eleventh planes and between said fifth and sixth planes, a spectral mirror in said eleventh plane adjacent said fifth plane, and a retarder between said polarization selective surface and said spectral mirror, and a substantially white light source positioned adjacent said polarization selective surface 19. The color video projector apparatus of claim 15, wherein said multiwave retarder retards said first color light in said recombined first and second color light beam by approximately an integer multiple of one wavelength plus one-half wavelength, such as $1\frac{1}{2}$, $2\frac{1}{2}$, $3\frac{1}{2}$, ..., $n\frac{1}{2}$, to effectively reorient the plane of polarization of said first color light by about 90-degrees, and wherein said multiwave retarder retards said second color light in said recombined first and second color light beam by approximately an integer multiple of one wavelength, such as 1, 2, 3, ..., n, to effectively leave the orientation of the plane of polarization of said second color light unchanged.

20. The method of projecting a color video image, comprising the steps of:
modulating a first color light beam having a first wavelength by changing selected pixel portions of said first color beam in such a manner that said first color beam carries a first color component of the color video image in a modulated first color beam that is linearly polarized in a first plane of polarization;
modulating a second color light beam having a second wavelength by changing selected pixel portions of said second color beam in such a manner that said second color beam carries a second color component of the color video image in a modulated second color beam that is also linearly polarized in said first plane of polarization;
combining said modulated first color beam with said second color beam in such a manner that they comprise a combined first and second colors image carrying beam propagated along a common path with said first and second color components linearly polarized in said first plane of polarization;
modulating a third color light beam by changing selected pixel portions of said third color beam in such a manner that said third color beam carries a third color component of the color video image in a modulated third color beam that is linearly polarized in a second plane of polarization;
combining said modulated third color beam with said combined first and second colors image carrying beam in such a manner that they comprise together a composite color video image carrying beam.

21. The method of claim 20, including the steps of creating separate first color, second color, and third color beams, respectively, steps in such a manner that each of said first color, second color, and third color beams are linearly polarized prior to said modulating steps.

22. The method of claim 21, including the steps of:
changing said selected pixel portions of said respective first color, second color, and third color beams by changing the planes of polarization of said selected pixel portions.

23. The method of claim 20, including the steps of simultaneously analyzing said modulated third color beam and combining said modulated third color beam with said combined first and second colors image carrying beam by directing said modulate third color beam and said combined first and second colors image carrying beam onto a polarization-selective surface that either transmits light having linear polarization oriented in said first plane of polarization and reflects light having linear polarization oriented in said second plane of polarization, or, vice versa, reflects light having linear polarization oriented in said firs plane cf polarization and transmits light having linear polarization oriented in said second plane of polarization, with said modulated third color beam, said combined first and second colors image carrying beam, and said polarization-selective surface oriented with respect to each other in such a manner that said modulated third color beam and said combined first and second colors image carrying beam are propagated together from said polarization-selective surface in said composite color video image carrying beam.

24. The method of projecting a color video image, comprising the steps of:
modulating a first color light beam having a first wavelength by changing selected pixel portions of said firs color beam in such a manner that said first color beam carries a first color component of the color video image in a modulated first color beam that is linearly polarized in a first plane of polarization;
modulating a second color light beam having a second wavelength by changing selected pixel portions of said second color beam in such a manner that said second color beam carries a second color component of the color video image in a modulated second color beam that is linearly polarized in a second plane of polarization;
combining said modulated first color beam with said second color beam in such a manner that they comprise a combined first and second colors image carrying beam propagated along a common path with said first color component linearly polarized in said first plane of polarization an said second color component linearly polarized in said second plane of polarization;
modulating a third color light beam by changing selected pixel portions of said third color beam in such a manner that said third color beam carries a third color component of the color video image in a modulated third color beam that is linearly polarized in said first plane of polarization; and
combining said modulated third color beam with said combined first and second colors image carrying beam in such a manner that they comprise together a composite color video image carrying beam.

25. The method of claim 24, including the steps of creating separate first color, second color, and third color beams, respectively, steps in such a manner that each of said first color, second color, and third color beams are linearly polarized prior to said modulating steps 26. The method of claim 25, including the steps of:
changing said selected pixel portions of said respective first color, second color, and third color beams by changing the planes of polarization of said selected pixel portions.

27. The method of claim 24, including the steps of simultaneously analyzing and combining said modulated first color beam and said modulated second color beam by directing said modulated first color beam and said modulated second color beam onto a polarization-selective surface that either transmits light having linear polarization oriented in said first plane of polarization and reflects light having linear polarization oriented in said second plane of polarization, or, vice versa, reflects light having linear polarization oriented in said first plane of polarization and transmits light having linear polarization oriented in said second plane of polarization, modulated first color beam, said modulated second color beam, polarization selective surface oriented with respect to each other in such a manner that said modulated first color beam and said modulated second color beam are propagated together along said common path emanating from said polarization-selective surface.

28. The method of claim 27, including the step of analyzing said modulated third color beam by directing said modulated third color beam onto a polarization-selective surface that either transmits light having linear polarization oriented in said first plane of polarization and reflects light having linear polarization oriented in said second plane of polarization, or, vice versa, reflects light having linear polarization oriented in said first plane of polarization and transmits light having linear polarization oriented in said second plane of polarization.

29. The method of combining a first beam of light with a second beam of linearly polarized light, wherein said first beam of light has a first color component with a first wavelength and a second color component with a second wavelength, and where each of said first and second color components are linearly polarized in a different plane of polarization, comprising the steps of:
positioning a polarization-selective surface that transmits light that is linearly polarized in a first plane and reflects light that is linearly polarized in a second plane in the proximity of both said first and second beams;
- reorienting the respective planes of polarization of said first and second color components in said first beam of light to one common plane of polarization and directing it onto said polarization-selective surface for either transmission through the polarization-selective surface or reflection by the polarization-selective surface; and
orienting the plane of polarization of said second beam to whichever of said first or second planes of polarization that is not the same as said common plane of polarization for either reflection through or transmission by said polarization-selective surface for propagation in the same path as said first beam.

30. The method of claim 29, including the steps of having the plane of polarization of said first color component in said first beam oriented orthogonal to the plane of polarization of said second color component in said first beam, and reorienting respective planes of polarization of said first and second color components to a common plane of polarization by directing said first beam through a multiwave retarder that retards the slow axis propagation of both of said first and second color components by an amount that results in retardation of the first color component by an amount of n+½ wavelength(s) where n is an integer, such as ½, 1½, 2½, 3½, ... n½, and that results in retardation of the second color component by an amount of n wavelength(s), where n is an integer, such as 0, 1, 2, 3, ..., n.

31. The method of projecting a color video image, comprising the steps of:
  modulating a first color light beam having a first wavelength by changing selected pixel portions of said firs color beam in such a manner that said first color beam carries a first color component of the color video image in a modulated first color beam that is linearly polarized in a first plane of polarization;
  modulating a second color light beam having a second wavelength by changing selected pixel portions of said second color beam in such a manner that said second color beam carries a second color component of the color video image in a modulated second color beam that is linearly polarized in a second plane of polarization;
  combining said modulated first color beam with said second color beam in such a manner that they comprise a combined first and second colors image carrying beam propagated along a common path with said first color component linearly polarized in said first plane of polarization and said second color component linearly polarized in said second plane of polarization;
  reorienting said first and second planes of polarization in said first and second colors image carrying beam to a common plane of polarization;
  modulating a third color light beam by changing selected pixel portions of said third color beam in such a manner that said third color beam carries a third color component of the color video image in a modulated third color beam that is linearly polarized in a third plane of polarization that is different than said common plane of polarization of said combined first and second colors image carrying beam; and
  combining said modulated third color beam with said combined first and second colors image carrying beam in such a manner that they comprise together a composite color video image carrying beam.

32. The method of claim 31, including the steps of creating separate first color, second color, and third color beams, respectively, steps in such a manner that each of said first color, second color, and third color beams are linearly polarized prior to said modulating steps.

33. The method of claim 32, including the steps of:
  changing said selected pixel portions of said respective first color, second color, and third color beams by rotating the planes of polarization of said selected pixel portions.

34. The method of claim 31, including the steps of simultaneously analyzing and combining said modulated first color beam and said modulated second color beam by directing said modulated first color beam and said modulated second color beam onto a polarization-selective surface that either transmits light having linear polarization oriented in said first plane of polarization and reflects light having linear polarization oriented in said second plane of polarization, or, vice versa, reflects light having linear polarization oriented in said first plane of polarization and transmits light having linear polarization oriented in said second plane of polarization, modulated first color beam, said modulated second color beam, polarization-selective surface oriented with respect to each other in such a manner that said modulated first color beam and said modulated second color beam are propagated together along said common path emanating from said polarization-selective surface.

35. The method of claim 31, including the steps of:
  orienting said first plane of polarization of said modulated first color beam orthogonal to said second plane of polarization of said modulated second color beam; and
  reorienting said first and second planes of polarization in said first and second colors image carrying beam to a common plane of polarization by passing said combined first and second colors image carrying beam through a multiwave retarder that retards the first color light by an amount represented by $m+\frac{1}{2}$ first wavelength(s), where m is an integer such that $m+\frac{1}{2}=\frac{1}{2}, 1\frac{1}{2}, 2\frac{1}{2}, 3\frac{1}{2}, \ldots, m\frac{1}{2}$, and that retards the second color light by an amount represented by n wavelength(s), where n is an integer such that n=0, 1, 2, 3, ..., n, thereby reorienting the plane of polarization of the first color light to correspond to said second plane of polarization of the second color light.

36. The method of claim 31, including the steps of simultaneously analyzing said modulated third color beam and combining said modulated third color beam with said combined first and second colors image carrying beam by directing said modulated third color beam and said combined first and second colors image carrying beam onto a polarization-selective surface that either transmits light having linear polarization oriented in said common plane or polarization and reflects light having linear polarization oriented in said third plane of polarization, or, vice versa, reflects light having linear polarization oriented in said common plane of polarization and transmits light having linear polarization oriented in said third plane of polarization, with said modulated third color beam, said combined first and second colors image carrying beam, and said polarization-selective surface oriented with respect to each other in such a manner that said modulated third color beam and said combined first and second colors image carrying beam are propagated together from said polarization-selective surface in said composite color video image carrying beam.

37. A system for projecting full color images from television or other video sources onto a display screen, comprising:
  light source means for providing a substantially collimated beam of white projection light;
  polarizer beamsplitter combiner means positioned to receive said collimated white projection light for splitting said collimated white projection light into a beam of white polarized light of "P" polarization state along a first axis, and into a beam of white polarized light of "S" polarization state along a second axis, said first and second axes being mutually orthogonal, for converting the light of "P" polarization state into a converted beam of white polarized light of "S" polarization state, and for combining the beam of "S" polarization state along said second axis with the converted beam of white polarized light of "S" polarization into a combined beam of "S" polarization along said first axis;

dichroic mirror means for first separating said combined beam of white polarized light of "S" polarization into three beams of polarized light of different primary colors to be polarization state modulated, said dichroic mirror means comprising first, second, and third dichroic mirrors being positioned to receive said combined beam of white polarized light of "S" polarization, said first dichroic mirror reflecting light of a first of said primary colors and transmitting light of a second and third of said primary colors to said second dichroic mirror, said second dichroic mirror reflecting light of a second of said primary colors and transmitting light of a third of said primary colors to said third dichroic mirror, said third dichroic mirror reflecting light of a third of said primary colors;

first, second, and third polarization state modulation means for selectively spatially modulating a primary color component video image onto each of said first, second, and third primary colors respectively received from said dichroic mirror means by modulation of the state of polarization of the light in each of said modulation means;

first polarizer beam recombiner means positioned to receive the spatially modulated beams from said first and second polarization state modulation means to be polarization analyzed and recombined into a recombined beam having a "P" polarization component from said first polarization stat modulation means and an "S" polarization component from said second polarization state modulation means;

retarder means positioned between said second polarization state modulation means and said first polarizer beam recombine means for converting the modulated beam from said second polarization state modulation means from the "P" polarization state to the "S" polarization state:

second polarizer beam recombine means positioned to receive the recombined modulated beam and the modulated beam from said third polarization state modulation means to be polarization analyzed and recombined into an output beam;

multi-wave retarder means positioned between said first and second polarizer beam recombine means for converting the "P" polarization component of said recombined beam to the "S" polarization state; and lens means positioned to receive said output beam and project it to said display screen.

38. The system of claim 37, wherein said polarizer beamsplitter combiner means further comprises:

multirefractive layer means making an angle of substantially 45 degrees with said collimated white projection light for splitting said collimated white projection light into its "P" and "S" polarization components; and specular mirror means making an angle of substantially 45 degrees with said second optic axis for redirecting said "S" polarization component along said first optic axis.

39. The system of claim 38, wherein said first, second, and third polarization state modulation means each comprises a transmission type twisted nematic liquid crystal light valve means having a plurality of pixels, said system further including means for selectively scanning said pixels for deriving therefrom said video image.

40. The system of claim 39, wherein said light source means comprises a lamp positioned between a collimating lens and a collimating mirror, said collimating mirror, said lamp, and said collimating lens being positioned in sequence on said first optic axis on a first side of said polarizer beamsplitter combiner means to direct said collimated white projection light onto said multirefractive layer means.

41. A system for projecting full color images from television or other video sources onto a display screen, comprising:

light source means for providing a collimated beam of white projection light;

polarizer beamsplitter combiner means positioned to receive said collimated white projection light for splitting said collimated white projection light into a beam of white polarized light of "P" polarization state along a first axis, and into a beam of white polarized light of "S" polarization state along a second axis, said first and second axes being mutually orthogonal, for converting the light of "P" polarization state along said first axis into a converted beam of white polarized light of "S" polarization state along said first axis, and for combining the beam of "S" polarization state along said second axis with the converted beam of white polarized light of "S" polarization along said first axis into a combined beam of "S" polarization along said first axis;

dichroic mirror means for first separating said combined beam of white polarized light of "S" polarization into three beams of polarized light of different primary colors to be polarization state modulated, said dichroic mirror means comprising first, second, and third dichroic mirrors being positioned to receive said combined beam of white polarized light of "S" polarization, said first dichroic mirror reflecting light of a first of said primary colors and transmitting light of a second and third of said primary colors to said second dichroic mirror, said second dichroic mirror reflecting light of a second of said primary colors and transmitting light of a third of said primary colors to said third dichroic mirror, said third dichroic mirror reflecting light of a third of said primary colors;

first, second, and third light modulation means for selectively spatially modulating a primary color component video image onto each of said first, second, and third primary colors respectively received from said dichroic mirror means by modulating the intensity of the light in each of said modulation means;

first polarizer beam recombiner means positioned to receive the spatially modulated beams from said first and second light modulation means to be polarization analyzed and recombined into a recombined beam having a "P" polarization component from said first light modulation means and an "S" polarization component from said second light modulation means;

retarder means positioned between said first light modulation means and said first polarizer beam recombine means for converting the modulated beam from said first light modulation means from the "S" polarization state to the "P" polarization state;

second polarizer beam recombine means positioned to receive the recombined modulated beam and the modulated beam from said third light modulation means to be polarization analyzed and recombined into an output beam;

multi-wave retarder means positioned between said first and second polarizer beam recombine means for converting the "P" polarization component of said recombined beam to the "S" polarization state; and lens means positioned to receive said output beam and project it to said display screen.

42. The system of claim 41, wherein said polarizer beamsplitter combiner means further comprises:

multirefractive layer means making an angle of substantially 45 degrees with said collimated white projection light for splitting said collimated white projection light into its "P" and "S" polarization components; and specular mirror means making an angle of substantially 45 degrees with said second optic axis for redirecting said "S" polarization component along said first optic axis.

43. The system of claim 42, wherein said first, second, and third light modulation means each comprises a transmission type microscopic electrically actuated mechanical shutter means having a plurality of pixels, said system further including means for selectively scanning said pixels for deriving therefrom said video image.

44. The system of claim 43, wherein said light source means comprises a lamp positioned between a collimating lens and a collimating mirror, said collimating mirror, said lamp, and said collimating lens being positioned in sequence on said first optic axis on a first side of said polarizer beamsplitter combiner means to direct said collimated white projection light onto said multirefractive layer means.

45. Color video projector apparatus, comprising:

first color light producing means for producing a substantially linearly polarized first color light beam of a first color in a first color light path;

second color light producing means for producing a substantially linearly polarized second color light beam of a second color in a second color light path;

third color light producing means for producing a substantially linearly polarized third color light beam of a third color in a third color light path;

first color light modulating means positioned in said first color light path for imparting changes in selected portions of said first color light beam in such a manner that said first color light beam carries a first color component of a video image in a first color light path;

second color light modulating means positioned in said second color light path for imparting changes in selected portions of said second color light beam in such a manner that said second color light beam carries a second color component of a video image in a second color modulated light path;

third color light modulating means positioned in said third color light path for imparting changes in selected portions of said third color light beam in such a manner that said third color light beam carries a third color component of a video image in a third color modulated light path;

first polarizing recombining means positioned in said first color modulated light path and in said second color modulated light path for recombining said first color beam after modulation with said second color beam after modulation in such a manner as to produce a recombined first and second color beam propagated in a path that is substantially common for both said first and second color light beams and comprising said first color light linearly polarized substantially in a first plane and said second color light linearly polarized in substantially a second plane, wherein said second plane is different from and not oriented parallel to said first plane;

multiwave retarder means positioned in said path of said recombined first and second color light beam for reorienting the plane of polarization of said first color light in said recombined first and second color beam to be substantially the same as the orientation of said second plane; and second polarizing recombining means positioned in said third color light path and in said path of said recombined first and second color light beam for recombining said third color beam after modulation with said recombined first and second color beam.

46. The color video projector apparatus of claim 45, wherein said first plane is substantially orthogonal to said second plane.

47. The color video projector apparatus of claim 45, wherein said multiwave retarder retards said first color light in said recombined first and second color light beam by approximately an integer multiple of one wavelength plus one-half wavelength, such as $1\frac{1}{2}$, $2\frac{1}{2}$, $3\frac{1}{2}$, ..., $n\frac{1}{2}$, to effectively reorient the plane of polarization of said first color light by about 90-degrees, and wherein said multiwave retarder retards said second color light in said recombined first and second color light beam by approximately an integer multiple of one wavelength, such as 1, 2, 3, ..., n, to effectively leave the orientation of the plane of polarization of said second color light unchanged.

48. The color video projection system of claim 47, wherein said first color light beam is blue with a wavelength of about 450 nm, said second color light beam is green with a wavelength of about 550 nm, and said multiwave retarder retards said blue and green light beams by about 1130 nm.

49. Beam combining apparatus for combining a first beam of light propagated in a first path with a second linearly polarized beam of light propagated in a second path, wherein said first beam of light has a first color component with a first wavelength and a second color component with a second wavelength, and wherein each of said first and second color components is linearly polarized in a different plane of polarization, comprising:

beamsplitter/combining means positioned in both said first and second beams for combining said first and second beams into a composite beam, wherein said beamsplitter combining means includes a polarization-selective surface that reflects light that is polarized in a first plane and transmits light that is polarized in a second plane, said polarization selective surface being oriented to transmit said second beam and to reflect components of said first beam into the path of the transmitted second beam; and multiwave retarder means positioned in said first beam of light in said first path for orienting the respective planes of polarization of said first and second color components to both be oriented in the plane of polarization that is reflected by said polarization selective surface.

50. The beam combining apparatus of claim 49, wherein said first path and said second path are orthogonal to each other and said polarization-selective surface is oriented such that both said first beam and said second beam are incident on said surface at about 45-degree angles.

51. A system for projecting full color images from television or other video sources onto a display screen, comprising:

light source means for providing a collimated beam of white projection light;

polarizer beamsplitter combiner means positioned to receive said collimated white projection light for splitting said collimated white projection light into a beam of white polarized light of "P" polarization state along a first axis, and into a beam of white polarized light of "S" polarization state along a second axis, said first and second axes being mutually orthogonal, for converting the light of "P" polarization state into a converted beam of white polarized light of "S" polarization state, and for combining the beam of "S" polarization state along said second axis with the converted beam of white polarized light of "S" polarization into a combined beam of "S" polarization along said first axis;

dichroic mirror means for first separating said combined beam of white polarized light of "S" polarization into three beams of polarized light of different primary colors to be polarization state modulated, said dichroic mirror means comprising first and second dichroic mirrors positioned to receive said combined beam of white polarized light of "S" polarization, said first dichroic mirror reflecting light of a first of said primary colors and transmitting light of a second and third of said primary colors to said second dichroic mirror, said second dichroic mirror reflecting light of a second of said primary colors and transmitting light of a third of said primary colors;

first, second, and third polarization state modulation means for selectively spatially modulating a primary color component video image onto each of said first, second, and third primary colors respectively received from said dichroic mirror means by modulation of the state of polarization of the light in each of said modulation means;

dichroic beam recombiner means positioned to receive the spatially modulated beams from said first and second polarization state modulation means to be recombined into a recombined beam having a "P" polarization component from said first and second polarization state modulation means;

polarizer beam recombine means positioned to receive the recombined modulated beam and the modulated beam from said third polarization state modulation means to be polarization analyzed and recombined into an output beam;

retarder means positioned between said third polarization state modulation means and said polarizer beam recombine means for converting the modulated beam from said third polarization state modulation means from the "P" polarization state to the "S" polarization state; and lens means positioned to receive said output beam and project it to said display screen.

52. The system of claim 51, wherein said polarizer beamsplitter combiner means further comprises:

multirefractive layer means making an angle of substantially 45 degrees with said collimated white projection light for splitting said collimated white projection light into its "P" and "S" polarization components; and specular mirror means making an angle of substantially 45 degrees with said second optic axis for redirecting said "S" polarization component along said first optic axis.

53. The system of claim 52, wherein said first, second, and third polarization state modulation means each comprises a transmission type twisted nematic liquid crystal light valve means having a plurality of pixels, said system further including means for selectively scanning said pixels for deriving therefrom said video image.

54. The system of claim 53, wherein said light source means comprises a lamp positioned between a collimating lens and a collimating mirror, said collimating mirror, said lamp, and said collimating lens being positioned in sequence on said first optic axis on a first site of said polarizer beamsplitter combiner means to direct said collimated white projection light onto said multirefractive layer means.

55. A system for projecting full color images from television or other video sources onto a display screen, comprising:

light source means for providing a collimated beam of white projection light;

polarizer beamsplitter combiner means positioned to receive said collimated white projection light for splitting said collimated white projection light into a beam of white polarized light of "P" polarization state along a first axis, and into a beam of white polarized light of "S" polarization state along a second axis, said first and second axes being mutually orthogonal, for converting the light of "P" polarization state into a converted beam of white polarized light of "S" polarization state, and for combining the beam of "S" polarization state along said second axis with the converted beam of white polarized light of "S" polarization into a combined beam of "S" polarization along said first axis;

dichroic mirror means for first separating said combined beam of white polarized light of "S" polarization into three beams of polarized light of different primary colors to be polarization state modulated, said dichroic mirror means comprising first and second dichroic mirrors positioned to receive said combined beam of white polarized light of "S" polarization, said first dichroic mirror reflecting light of a first of said primary colors and transmitting light of a second and third of said primary colors to said second dichroic mirror, said second dichroic mirror reflecting light of a second of said primary colors and transmitting light of a third of said primary colors;

first, second, and third light modulation means for selectively spatially modulating a primary color component video image onto each of said first, second, and third primary colors respectively received from said dichroic mirror means by modulating the intensity of the light in each of said modulation means;

dichroic beam recombiner means positioned to receive the spatially modulated beams from said first and second light modulation means to be recombined into a recombined beam having a "P" polarization component from said first and second light modulation means;

polarizer beam recombine means positioned to receive the recombined modulated beam and the modulated beam from said third light modulation means to be polarization analyzed and recombined into an output beam;

retarder means positioned between said third light modulation means and said polarizer beam recombine means for converting the modulated beam from said third light modulation means from the "P" polarization state to the "S" polarization state;

lens means positioned to receive said output beam and project it to said display screen.

56. The system of claim 55, wherein said polarizer beamsplitter combiner means further comprises:

multirefractive layer means making an angle of substantially 45 degrees with said collimated white projection light for splitting said collimated white projection light into its "P" and "S" polarization components; and specular mirror means making an angle of substantially 45 degrees with said second optic axis for redirecting said "S" polarization component along said first optic axis.

57. The system of claim 56, wherein said first, second, and third light modulation means each comprises a transmission type microscopic electrically actuated mechanical shutter means having a plurality of pixels, said system further including means for selectively scanning said pixels for deriving therefrom said video image.

58. The system of claim 57, wherein said light source means comprises a tungsten filament lamp positioned between a collimating lens and a collimating mirror, said collimating mirror, said lamp, and said collimating lens being positioned in sequence on said first optic axis on a first side of said polarizer beamsplitter combiner means to direct said collimated white projection light onto said multirefractive layer means.

59. Color video projector apparatus, comprising:

first color light producing means for producing a substantially linearly polarized first color light beam of a first color in a first color light path;

second color light producing means for producing a substantially linearly polarized second color light beam of a second color in a second color light path;

third color light producing means for producing a substantially linearly polarized third color light beam of a third color in a third color light path;

first color light modulating means positioned in said first color light path for imparting changes in selected portions of said first color light beam in such a manner that said first color light beam carries a first color component of a video image in a first color light path;

second color light modulating means positioned in said second color light path for imparting changes in selected portions of said second color light beam in such a manner that said second color light beam carries a second color component of a video image in a second color modulated light path;

third color light modulating means positioned in said third color light path for imparting changes in selected portions of said third color light beam in such a manner that said third color light beam carries a third color component of a video image in a third color modulated light path;

dichroic beam recombining means positioned in said first color modulated light path and in said second color modulated light path for recombining said first color beam after modulation with said second color beam after modulation in such a manner as to produce a recombined first and second color beam propagated in a path that is substantially common for both said first and second color light beams;

polarizing recombining means positioned in said third color light path and in said path of said recombined first and second color light beam for recombining said third color beam after modulation with said recombined first and second color beam; and retarder means positioned between said third color light modulating means and said polarizing recombining means for converting the modulated beam from said third light modulation means from the "P" polarization state to the "S" polarization state.

60. Beam combining apparatus for combining a first beam of light propagated in a first path with a second linearly polarized beam of light propagated in a second path, wherein said first beam of light has a first color component with a first wavelength and a second color component with a second wavelength, and wherein each of said first and second color components is linearly polarized in the same plane of polarization, comprising beamsplitter/recombining means positioned in both said first and second beams for combining said first and second beams into a composite beam, wherein said beamsplitter recombining means includes a polarization-selective surface that reflects light that is polarized in a first plane and transmits light that is polarized in a second plane, said polarization selective surface being oriented to transmit said second beam and to reflect components of said first beam into the path of the transmitted second beam.

61. The beam combining apparatus of claim 60, wherein said first path and said second path are orthogonal to each other and said polarization-selective surface is oriented such that both said first beam and said second beam are incident on said surface at about 45-degree angles.

62. The method of combining a first beam of light with a second beam of linearly polarized light, wherein said first beam of light has a first color component with a first wavelength and a second color component with a second wavelength, and where each of said first and second color components is linearly polarized in a common plane of polarization, comprising the steps of:

positioning a polarization-selective surface that transmits light that is linearly polarized in a first plane and reflects light that is linearly polarized in a second plane in the proximity of both said first and second beams; and orienting the plane of polarization of said second beam to whichever of said first or second planes of polarization that is not the same as said common plane of polarization for either reflection through or transmission by said polarization-selective surface for propagation in the same path as said first beam.

63. A system for projecting full color images from television or other video sources onto a display screen, comprising:

light source means for providing a collimated beam of white projection light;

polarizer beamsplitter combiner means positioned to receive said collimated white projection light for splitting said collimated white projection light into a beam of white polarized light of "P" polarization state along a first axis, and into a beam cf white polarized light of "S" polarization state along a second axis, said first and second axes being mutually orthogonal, for converting the light of "P" polarization state into a converted beam of white polarized light of "S" polarization state, and for combining the beam of "S" polarization state along said second axis with the converted beam of white polarized light of "S" polarization into a combined beam of "S" polarization along said first axis;

dichroic mirror means for first separating said combined beam of white polarized light of "S" polarization into three beams of polarized light of different primary colors to be polarization state modulated, said dichroic mirror means comprising first and second dichroic mirrors positioned to receive said combined beam of white polarized light of "S" polarization, said first dichroic mirror reflecting light of a first of said primary colors and transmitting light of a second and third of said primary colors to said second dichroic mirror, said second dichroic mirror reflecting light of a second of said primary colors and transmitting light of a third of said primary colors;

first, second, and third polarization state modulation means for selectively spatially modulating a primary color component video image onto each of said first, second, and third primary colors respectively received from said dichroic mirror means by modulation of the state of polarization of the light in each of said modulation means;

first polarizer beam recombiner means positioned to receive the spatially modulated beams from said first and second polarization state modulation means to be recombined into a recombined beam having an "S" polarization component from said first polarization state modulation means and a "P" polarization component from said second polarization state modulation means;

retarder means positioned between said first polarization state modulation means and said first polarizer beam recombiner means for converting the modulated beam from said first polarization state modulation means from the "P" polarization state to the "S" polarization state;

beam analyzer means positioned to receive the modulated beam from said third polarization state modulation means for analyzing said third modulated beam;

dichroic beam recombiner means positioned to receive the recombined modulated beam and the modulated beam from said beam analyzer means to be recombined into an output beam; and lens means positioned to receive said output beam and project it to said display screen.

64. The system of claim 63, wherein said polarizer beamsplitter combiner means further comprises:

multirefractive layer means making an angle of substantially 45 degrees with said collimated white projection light for splitting said collimated white projection light into its "P" and "S" polarization components; and specular mirror means making an angle of substantially 45 degrees with said second optic axis for redirecting said "S" polarization component along said first optic axis.

65. The system of claim 64, wherein said first, second, and third polarization state modulation means each comprises a transmission type twisted nematic liquid crystal light valve means having a plurality of pixels, said system further including means for selectively scanning said pixels for deriving therefrom said video image.

66. The system of claim 65, wherein said light source means comprises a lamp positioned between a collimating lens and a collimating mirror, said mirror, said lamp, and said collimating lens being positioned in sequence on said first optic axis on a first side of said polarizer beamsplitter combiner means to direct said collimated white projection light onto said multirefractive layer means.

67. A system for projecting full color images from television or other video sources onto a display screen, comprising:

light source means for providing a collimated beam of white projection light;

polarizer beamsplitter combiner means positioned to receive said collimated white projection light for splitting said collimated white projection light into a beam of white polarized light of "P" polarization state along a first axis, and into a beam of white polarized light of "S" polarization state along a second axis, said first and second axes being mutually orthogonal, for converting the light of "P" polarization state into a converted beam of white polarized light of "S" polarization state, and for combining the beam of "S" polarization state along said second axis with the converted beam of white polarized light of "S" polarization into a combined beam of "S" polarization along said first axis;

dichroic mirror means for first separating said combined beam of white polarized light of "S" polarization into three beams of polarized light of different primary colors to be polarization state modulated, said dichroic mirror means comprising first and second dichroic mirrors positioned to receive said combined beam of white polarized light of "S" polarization, said first dichroic mirror reflecting light of a first of said primary colors and transmitting light of a second and third of said primary colors to said second dichroic mirror, said second dichroic mirror reflecting light of a second of said primary colors and transmitting light of a third of said primary colors;

first, second, and third light modulation means for selectively spatially modulating a primary color component video image onto each of said first, second, and third primary colors respectively received from said dichroic mirror means by modulating the intensity of the light in each of said modulation means:

first polarizer beam recombiner means positioned to receive the spatially modulated beams from said first and second light modulation means to be recombined into a recombined beam having an "S" polarization component from said first light modulation means and a "P" polarization component from said second light modulation means;

retarder means positioned between said first light modulation means and said first polarizer beam recombine means for converting the modulated beam from said first light modulation means from the "P" polarization state to the "S" polarization state;

beam analyzer means positioned to receive the modulated beam from said third light modulation means for analyzing said third modulated beam;

dichroic beam recombiner means positioned to receive the recombined modulated beam and the modulated beam from said beam analyzer means to be recombined into an output beam; and lens means positioned to receive said output beam and project it to said display screen.

68. The system of claim 67, wherein said polarizer beamsplitter combiner means further comprises:

multirefractive layer means making an angle of substantially 45 degrees with said collimated white projection light for splitting said collimated white projection light into its "P" and "S" polarization components; and specular mirror means making an angle of substantially 45 degrees with said second optic axis for redirecting said "S" polarization component along said first optic axis.

69. The system of claim 68, wherein said first, second, and third light modulation means each comprises a transmission type microscopic electrically actuated mechanical shutter means having a plurality of pixels, said system further including means for selectively scanning said pixels for deriving therefrom said video image.

70. The system of claim 69, wherein said light source means comprises a tungsten filament lamp positioned between a collimating lens and a collimating mirror, said mirror, said lamp, and said collimating lens being positioned in sequence on said first optic axis on a first side of said polarizer beamsplitter combiner means to direct said collimated white projection light onto said multirefractive layer means.

71. Color video projector apparatus, comprising:

first color light producing means for producing a substantially linearly polarized first color light beam of a first color in a first color light path;

second color light producing means for producing a substantially linearly polarized second color light beam of a second color in a second color light path;

third color light producing means for producing a substantially linearly polarized third color light beam of a third color in a third color light path;

first color light modulating means positioned in said first color light path for imparting changes in selected portions of said first color light beam in such a manner that said first color light beam carries a first color component of a video image in a first color light path;

second color light modulating means positioned in said second color light path for imparting changes in selected portions of said second color light beam in such a manner that said second color light beam carries a second color component of a video image in a second color modulated light path;

third color light modulating means positioned in said third color light path for imparting changes in selected portions of said third color light beam in such a manner that said third color light beam carries a third color component of a video image in a third color modulated light path;

polarizing recombining means positioned in said first color modulated light path and in said second color modulated light path for recombining said first color beam after modulation with said second color beam after modulation in such a manner as to produce a recombined first and second color beam propagated in a path that is substantially common for both said first and second color light beams and comprising said first color light linearly polarized substantially in a first plane and said second color light linearly polarized in substantially a second plane, wherein said second plane is different from and not oriented parallel to said first plane;

beam analyzing means positioned in said third color light path for analyzing said modulated third color light beam; and dichroic beam recombiner means positioned to receive the recombined modulated beam and the modulated beam from said beam analyzing means to be recombined into an output beam.

72. Color video projector apparatus, comprising:

first color light producing means for producing a substantially linearly polarized first color light beam of a first color in a first color light path;

second color light producing means for producing a substantially linearly polarized second color light beam of a second color in a second color light path, wherein said second color light path is orthogonal to said first color light path;

third color light producing means for producing a substantially linearly polarized third color light beam of a third color in a third color light path, wherein said third color light path is in parallel, spaced apart relation to said first color light path;

first color light modulating means positioned in said first color light path for imparting changes in selected portions of said first color light beam in such a manner that said first color light beam carries a first color component of a video image in said first color light path;

second color light modulating means positioned in said second color light path and orthogonal to said first color light producing means such that said first and second color light modulating means define two adjacent sides of a first cube, having a first included angle of substantially ninety (90) degrees, for imparting changes in selected portions of said second color light beam in such a manner that said second color light beam carries a second color component of a video image in said second color light path;

third color light modulating means positioned in said third color light path and orthogonal to said second color light modulating means such that said second and third color light modulating means define two adjacent sides of a second cube, having a second included angle of substantially ninety (90) degrees, and further wherein said second color light modulating means is common to said first defined cube and said second defined cube, for imparting changes in selected portions of said third color light beam in such a manner that said third color light beam carries a third color component of a video image in said third color light path;

dichroic color recombining means positioned in said first color modulated light path and in said second color modulated light path, such that said dichroic color recombining means substantially bisects said first included angle of said first cube defined by said first color light modulating means and said second color light modulating means forming a diagonal within said first defined cube, for recombining said first color beam after modulation with said second color beam after modulation in such a manner as to produce a recombined first and second color beam propagated in a path that is substantially parallel to said first color light path and wherein said recombined beam comprises said first color light and said second color light linearly polarized substantially in a first plane;

beam redirecting means positioned in said third color modulated light path in parallel spaced-apart relation to said dichroic color recombining means for redirecting said third color light beam after modulation in a redirected path that is substantially parallel to said second color light path;

retarder means positioned in said redirected third color light beam path after modulation and being substantially linearly aligned with said second color light modulating means, such that said retarder means, said third color light modulating means, and said beam redirecting means define a polyhedron whose two parallel congruent faces are triangular, for reorienting the plane of polarization of said third color light to a second plane; and polarizing recombining means positioned in said third color light path and in said path of said recombined first and second color light beam for recombining said third color beam after modulation with said recombined first and second color beam to form an output beam.

73. The color video projector apparatus of claim 72, wherein said first plane of polarization is substantially orthogonal to said second plane of polarization.

74. The color video projector apparatus of claim 73, wherein said first, second, and third color light producing means comprise:

white light source means for providing a substantially linearly polarized collimated beam of white projection light in a white projection light path;

blue light dichroic mirror means positioned in said white projection light path and substantially linearly aligned with said dichroic color recombining means for producing a blue color light beam in a blue color light path that is substantially parallel to said first color light modulating means;

blue color light beam redirecting means positioned in said blue color light path and oriented at substantially forty five (45) degrees from said first color light modulating means for redirecting said first color light path ninety (90) degrees to be incident on said first color light modulating means; and green dichroic mirror means substantially linearly aligned with said dichroic color recombining means in parallel, spaced apart relation to said blue dichroic mirror means and substantially bisecting said second included angle between said second color light modulating means and said third color light modulating means for producing a green color light beam in a green color light path that is incident on said second color light modulating means, and for producing a rad color light beam in a red color light path that is incident on said third color light modulating means.

75. The color video projector apparatus of claim 74, wherein said white light source means includes polarizing beamsplitter combiner means positioned to receive said collimated white projection light for splitting said collimated white projection light into a beam of white polarized light of "P" polarization state along a first axis, and into a beam of white polarized light of "S" polarization state along a second axis, said first and second axes being mutually orthogonal, for converting the light of "P" polarization state along said first axis into a converted beam of white polarized light of "S" polarization state along said first axis, and for combining the beam of "S" polarization state along said second axis with the converted beam of white polarized light of "S" polarization along said first axis into a combined beam of "S" polarization along said first axis.

76. The color video projector apparatus of claim 72 including lens means to receive said output beam and project it to a display screen.

* * * * *